(12) United States Patent
Nakadai et al.

(10) Patent No.: US 8,440,901 B2
(45) Date of Patent: May 14, 2013

(54) MUSICAL SCORE POSITION ESTIMATING APPARATUS, MUSICAL SCORE POSITION ESTIMATING METHOD, AND MUSICAL SCORE POSITION ESTIMATING PROGRAM

(75) Inventors: Kazuhiro Nakadai, Wako (JP); Takuma Otsuka, Wako (JP); Hiroshi Okuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 133 days.

(21) Appl. No.: 13/038,124

(22) Filed: Mar. 1, 2011

(65) Prior Publication Data

US 2011/0214554 A1  Sep. 8, 2011

Related U.S. Application Data

(60) Provisional application No. 61/309,618, filed on Mar. 2, 2010.

(51) Int. Cl.
  *G10H 1/00*  (2006.01)
(52) U.S. Cl.
  USPC ............................................. 84/612; 84/652
(58) Field of Classification Search ............ 84/600–602, 84/612, 652
  See application file for complete search history.

(56) References Cited

U.S. PATENT DOCUMENTS

| | | | | |
|---|---|---|---|---|
| 4,745,836 A * | 5/1988 | Dannenberg | ..................... | 84/610 |
| 5,400,687 A * | 3/1995 | Ishii | ............................. | 84/477 R |
| 5,521,323 A * | 5/1996 | Paulson et al. | .................. | 84/610 |
| 5,521,324 A * | 5/1996 | Dannenberg et al. | ........... | 84/612 |
| 5,693,903 A * | 12/1997 | Heidorn et al. | ................. | 84/668 |
| 5,852,251 A * | 12/1998 | Su et al. | ........................... | 84/645 |
| 5,869,783 A * | 2/1999 | Su et al. | ........................... | 84/612 |
| 5,913,259 A * | 6/1999 | Grubb et al. | .................... | 84/610 |
| 5,952,597 A * | 9/1999 | Weinstock et al. | ............. | 84/609 |
| 6,084,168 A * | 7/2000 | Sitrick | ........................ | 84/477 R |
| 6,107,559 A * | 8/2000 | Weinstock et al. | ............. | 84/634 |
| 6,156,964 A * | 12/2000 | Sahai et al. | ................. | 84/470 R |
| 6,166,314 A * | 12/2000 | Weinstock et al. | .......... | 84/483.1 |
| 6,333,455 B1 * | 12/2001 | Yanase et al. | .................... | 84/609 |
| 6,348,648 B1 * | 2/2002 | Connick, Jr. | ................ | 84/477 R |
| 6,365,819 B2 * | 4/2002 | Yamada | .......................... | 84/609 |
| 6,376,758 B1 * | 4/2002 | Yamada et al. | ................. | 84/612 |
| 6,380,474 B2 * | 4/2002 | Taruguchi et al. | .............. | 84/612 |
| 6,821,203 B2 * | 11/2004 | Suga et al. | ......................... | 463/7 |
| 6,971,882 B1 * | 12/2005 | Kumar et al. | ............. | 434/307 A |
| 7,034,217 B2 * | 4/2006 | Pachet | ............................ | 84/609 |
| 7,064,261 B2 * | 6/2006 | Shao | ........................... | 84/477 R |
| 7,164,076 B2 * | 1/2007 | McHale et al. | ................. | 84/616 |
| 7,189,912 B2 * | 3/2007 | Jung | ............................... | 84/610 |
| 7,323,629 B2 * | 1/2008 | Somani et al. | ............. | 84/470 R |

(Continued)

FOREIGN PATENT DOCUMENTS

| | | |
|---|---|---|
| JP | 10-228519 | 8/1998 |
| JP | 2006-201278 | 8/2006 |

*Primary Examiner* — David S. Warren
(74) *Attorney, Agent, or Firm* — Nelson Mullins Riley & Scarborough LLP; Anthony A. Laurentano

(57) ABSTRACT

A musical score position estimating apparatus includes a sound feature quantity generating unit configured to generate a feature quantity of an input sound signal, and, a score position estimating unit configured to calculate a weight coefficient based on the feature quantity of the sound signal and a feature quantity of musical score information and estimates a musical score position using a virtual musical score position and a virtual tempo corresponding to the weight coefficient.

6 Claims, 16 Drawing Sheets

U.S. PATENT DOCUMENTS

| | | | |
|---|---|---|---|
| 7,470,856 B2 * | 12/2008 | Jung et al. | 84/645 |
| 7,565,059 B2 * | 7/2009 | Neuman | 386/248 |
| 7,579,541 B2 * | 8/2009 | Guldi | 84/470 R |
| 7,612,278 B2 * | 11/2009 | Sitrick et al. | 84/609 |
| 7,649,134 B2 * | 1/2010 | Kashioka | 84/600 |
| 7,985,917 B2 * | 7/2011 | Morris et al. | 84/637 |
| 2011/0214554 A1 * | 9/2011 | Nakadai et al. | 84/477 R |
| 2011/0314995 A1 * | 12/2011 | Lyon et al. | 84/609 |
| 2012/0160078 A1 * | 6/2012 | Lyon et al. | 84/609 |

* cited by examiner

MUSICAL SCORE POSITION ESTIMATING APPARATUS, MUSICAL SCORE POSITION ESTIMATING METHOD, AND MUSICAL SCORE POSITION ESTIMATING PROGRAM

CROSS REFERENCE TO RELATED APPLICATIONS

This application claims benefit from U.S. Provisional application Ser. No. 61/309,618, filed Mar. 2, 2010, the contents of which are incorporated herein by reference.

BACKGROUND OF THE INVENTION

1. Field of the Invention

The present invention relates to a musical score position estimating apparatus, a musical score position estimating method, and a musical score position estimating program.

2. Description of the Related Art

In recent years, the increasing use of robots in human society has been anticipated. Such robots need to be equipped with ways to interact with human beings. Examples of media for realizing such ways include dialogue using languages, music, and eye contact. In particular, music is a promising medium and an important and common factor beyond region or race across human society. For example, it is anticipated that robots will dance to music, sing, or play musical instruments with human beings.

For example, Japanese Patent No. 3147846 discloses an image recognition apparatus converting a musical score into two-dimensional image data, removing staff data and bar line data from the image data, and recognizing notes and symbols. JP-A-2006-201278 proposes a method of automatically analyzing the metrical structure of tunes in order to calculate the value of the strength of each beat mark in a piece of music based on the musical score data and a grouping structure analysis result, storing the strength values in storage means in correlation with the beat marks, reading the strength of the beat marks included in each candidate for the metrical structure of the next level from the storage means, summing the values, comparing the total sums of the strength values at the beat marks in the candidates, and selecting a candidate having the largest total sum as the metrical structure of the next level.

However, in JP-A-2006-201278, the position (hereinafter, referred to as a score position) at which an input tune is located in a musical score could not be recognized. That is, the method described in JP-A-2006-201278 has a problem in that it may fail to extract the beat time or the tempo of a piece of music in a performance.

SUMMARY OF THE INVENTION

The invention is made in consideration of the above-mentioned problem and it is a goal of the invention to provide a musical score position estimating apparatus, a musical score position estimating method, and a musical score position estimating program, which can estimate a musical score position in a piece of music in a performance.

According to a first aspect of the invention, there is provided a musical score position estimating apparatus including: a sound feature quantity generating unit configured to generate a feature quantity of an input sound signal; and a score position estimating unit configured to calculate a weight coefficient based on the feature quantity of the sound signal and a feature quantity of musical score information and estimates a musical score position using a virtual musical score position and a virtual tempo corresponding to the weight coefficient.

According to a second aspect of the invention, the musical score position estimating apparatus may further include a state transition unit configured to update the virtual musical score position every predetermined interval based on the virtual tempo and a first random number and updates the virtual tempo every predetermined interval based on a second random number.

According to a third aspect of the invention, the feature quantities may include a frequency characteristic or a chroma vector including a plurality of values of intensity for each musical scale, and the musical score estimating unit may calculate the weight coefficient using a chroma vector weight coefficient indicating the similarity between the chroma vector based on the sound signal and the chroma vector based on the musical score information, a frequency characteristic weight coefficient indicating the similarity between the frequency characteristic of the sound signal and the frequency characteristic of the musical score information, or a tempo weight coefficient based on the autocorrelation of the frequency characteristic of the sound signal.

According to a fourth aspect of the invention, the musical score position estimating apparatus may further include a confidence calculating unit configured to calculate the confidence of the estimated musical score position based on the virtual musical score position, and determines whether the estimated musical score position should be output based on the calculated confidence.

According to a fifth aspect of the invention, the musical score position estimating apparatus may further include a confidence calculating unit configured to calculate the confidence of the estimated musical score position and the score position estimating unit may determine whether an interval of the feature quantity from which the weight coefficient is calculated should be extended based on the calculated confidence.

According to the first aspect of the invention, since the feature quantity of an input sound signal is generated, the weight coefficient is calculated based on the feature quantity of the sound signal and a feature quantity of musical score information, and the musical score position is estimated using the virtual musical score position and the virtual tempo corresponding to the weight coefficient, it is possible to estimate the musical score position in a piece of music in a performance.

According to the second aspect of the invention, since the virtual musical score position is updated based on the virtual tempo and the first random number and the virtual tempo is updated based on the second random number, it is possible to robustly estimate the musical score position even if the tempo of the piece of music in a performance varies.

According to the third aspect of the invention, since the weight coefficient indicating the similarity between the sound signal and the musical score information is calculated based on the feature quantity including the chroma vector or the frequency characteristic, the virtual musical score position and the virtual tempo having a certain degree of similarity between the sound signal and the musical score information are emphasized. Accordingly, it is possible to estimate the musical score position in a piece of music in a performance with high precision.

According to the fourth aspect of the invention, since it is determined whether the estimated musical score position should be output based on the confidence of the estimated musical score position, it is possible to guarantee the confidence of the output musical score position.

According to the fifth aspect of the invention, since it is determined whether the interval of the feature quantity from which the weight coefficient is calculated should be extended based on the calculated confidence, it is possible to extend the interval so as to include the feature quantity guaranteeing the confidence of the estimated musical score position, thereby guaranteeing the confidence of the output musical score position.

DETAILED DESCRIPTION OF THE INVENTION

First Embodiment

Hereinafter, a first embodiment of the invention will be described with reference to the accompanying drawings.

Figure 1:
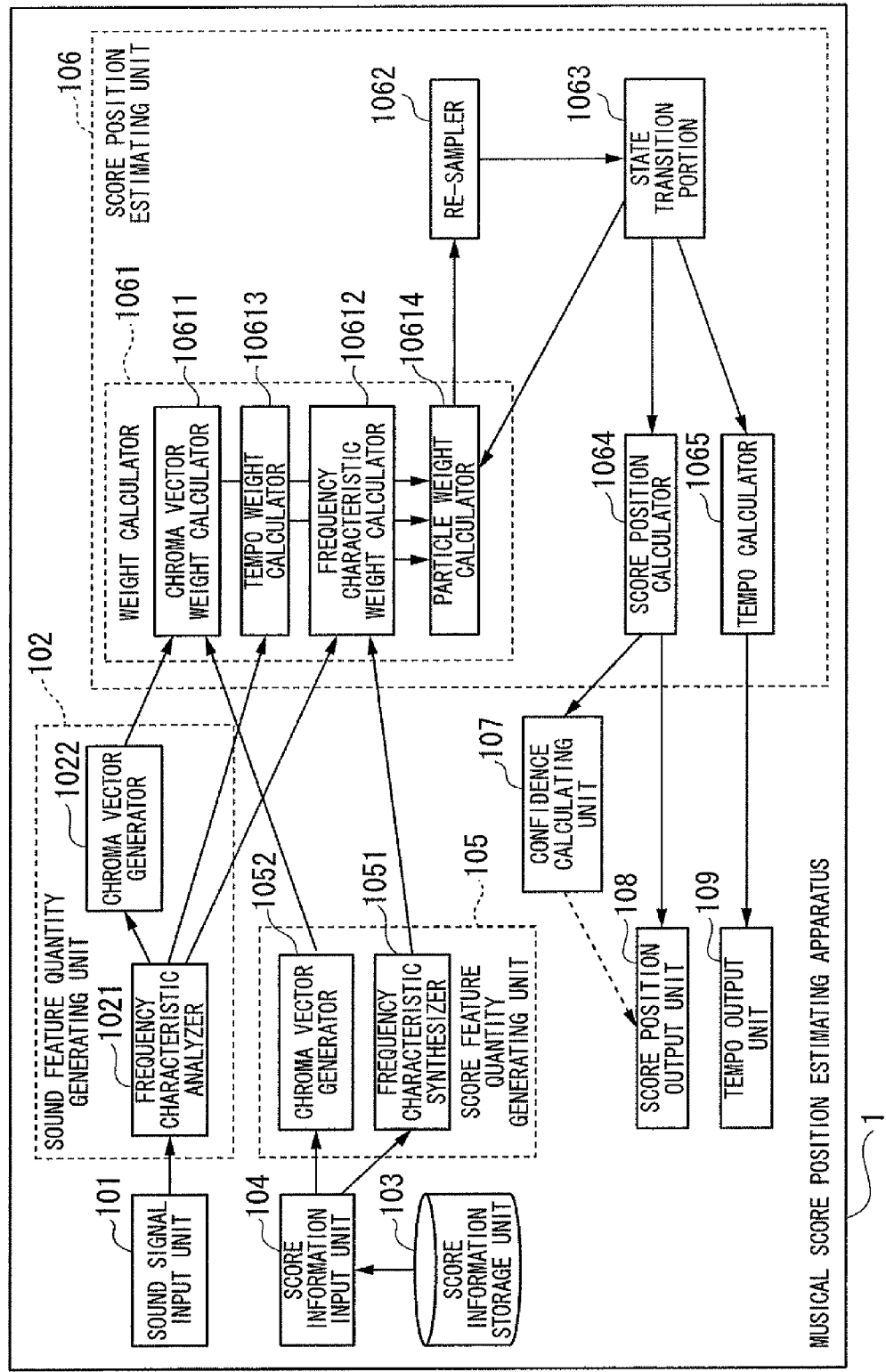
FIG. 1 is a schematic diagram illustrating the configuration of a musical score position estimating apparatus according to a first embodiment of the invention.

FIG. 1 is a schematic diagram illustrating the configuration of a musical score position estimating apparatus 1 according to the first embodiment of the invention. The musical score position estimating apparatus 1 includes a sound signal input unit 101, a sound feature quantity generating unit 102, a score information storage unit 103, a score information input unit 104, a score feature quantity generating unit 105, a score position estimating unit 106, a confidence calculating unit 107, a score position output unit 108, and a tempo output unit 109.

The sound signal input unit 101 converts sound waves resulting from a performed piece of music into a digital sound signal and outputs the digital sound signal to the sound feature quantity generating unit 102. The sound signal input unit 101 includes, for example, a microphone and an analog-to-digital (A/D) converter (not shown). The microphone receives the sound waves in a frequency band (for example, 20 Hz to 20 kH) which can be heard by a human, generates an analog sound signal, and outputs the generated analog sound signal to the A/D converter. The A/D converter converts the analog sound signal input from the microphone into a digital sound signal and outputs the digital sound signal to the sound feature quantity generating unit 102. Here, the A/D converter converts the input analog sound signal into a quantized digital sound signal by performing a PCM (Pulse Code Modulation) process on the amplitude with a sampling frequency of 44.1 kHz into 16-bit binary data.

The sound feature quantity generating unit 102 generates a feature quantity (sound feature quantity or audio feature quantity) from the digital sound signal (or audio signal) input from the sound signal input unit 101 and outputs the generated sound feature quantity to the score position estimating unit 106.

Specifically, the sound feature quantity generating unit 102 generates, for example, a spectrogram and a chroma vector as the sound feature quantity. The sound feature quantity generating unit 102 includes a frequency characteristic analyzer 1021 and a chroma vector generator 1022.

The frequency characteristic analyzer 1021 transforms the digital sound signal input from the sound signal input unit 101 from a time-domain signal to a frequency-domain signal. Here, the frequency characteristic analyzer 1021 transforms the digital sound signal to the frequency-domain signal, for example, for each frame including 2048 samples by the fast Fourier transform (FFT). The frame is a range of the digital sound signal to be subjected to the FFT. The frequency characteristic analyzer 1021 shifts the frame so as to include new signal samples (for example, 441 samples when the sampling frequency is 44.1 kHz) every predetermined time t (for example, at an interval of 10 ms).

The frequency characteristic analyzer 1021 calculates the amplitude (absolute value) of the frequency-domain signal transformed as a spectrogram (hereinafter, referred to as sound spectrogram) $X_{f,t}$ every frame t and outputs the calculated sound spectrogram $X_{f,t}$ to the chroma vector generator 1022 and the score position estimating unit 106. Here, f represents frequency.

The chroma vector generator 1022 calculates a chroma vector (hereinafter, referred to as sound chroma vector) $c_t^a$ of the sound signal based on the sound spectrogram $X_{f,t}$ input from the frequency characteristic analyzer 1021. The chroma vector is a vector having the power of the components of each scale (chroma) as an element. For example, the chroma vector is a vector (for example, the number of elements thereof is 12) having the values of intensity of the components of the scales in 12 scales (C, C#, D, D#, E, F, F#, G, G#, A, A#, and B) constituting Western music as elements.

The chroma vector generator 1022 calculates the elements $c_t^a(n)$ of the scales n in the sound chroma vector $c_t^a(n)=[c_t^a(1), c_t^a(2), \ldots, c_t^a(12)]$, for example, using the following expression.

Expression 1

$$c_t^a(n) = \sum_{h=Oct_L}^{Oct_H} \int_0^\infty BPF_{n,h}(f)|X_{f,t}|^2 \, df \quad (1)$$

In Expression 1, $Oct_L$ represents a predetermined lower limit of the octave (lower-limited octave). $Oct_H$ represents a predetermined upper limit of the octave. $BPF_{n,h}(f)$ represents an input and output characteristic of a band-pass filter (BPF) extracting the component of the scale n in the h-th octave. This is a function of which the value is the maximum in the frequency $f_{n,h}$ of the scale n in the h-th octave and the value approaches zero as the frequency f goes close to zero or infinite. $|X_{f,t}|^2$ represents a power spectrum. The musical score position estimating apparatus 1 can extract the intensity of each scale in different octaves and neglect a harmonic structure of a sound signal, by using the chroma vector. Therefore, the musical score position estimating apparatus 1 can extract a timing variation of an important scale to express a melody and can exclude the other octave difference which is not important to express the melody.

The chroma vector generator 1022 outputs the calculated sound chroma vector $c_t^a$ to the score position estimating unit 106.

The score information storage unit 103 stores score information of each tune. The score information is expressed by a vector $n_k = [n_k^1, n_k^2, \ldots, n_k^{r_k}]^T$ having scale information pieces $n_k^r$ representing the scales of a tune as elements every score frame k (where k is an integer equal to 1 or greater than 1). Here, r is an integer equal to or greater than 1 and equal to or less than $r_k$. T represents the transposition of the vector. The score frame is a unit time by which a tune is temporally divided in a score information piece of the tune. For example, when the length of a quarter note is 12 frames, the time resolution of the score information is ⅓ of the sixteenth note. For example, the score information $n_2$ representing the scales C, E, and G in score frame 2 is expressed by a vector [C, E, G] having three elements.

The score information input unit 104 reads the score information $n_k$ of a tune to be processed from the score information storage unit 103. The score information input unit 104 outputs the read score information $n_k$ to the score feature quantity generating unit 105.

The sound feature quantity generating unit 105 generates the feature quantity of the score information (hereinafter, referred to as score feature quantity) based on the score information $n_k$ input from the score information input unit 104 and outputs the generated score feature quantity to the score position estimating unit 106. The score feature quantity generating unit 105 generates, for example, a spectrogram and a chroma vector as the score feature quantity. Here, the spectrogram and the chroma vector generated by the score feature quantity generating unit 105 are referred to as a score spectrogram and a score chroma vector, respectively.

The score feature quantity generating unit 105 includes a frequency characteristic synthesizer 1051 and a chroma vector generator 1052.

The frequency characteristic synthesizer 1051 generates a score spectrogram $X'_{f,k}$ based on the score information $n_k$ input from the score information input unit. The score spectrogram $X'_{f,t}$ is a frequency characteristic of a sound signal indicating music to be performed based on the score information $n_k$.

The frequency characteristic synthesizer 1051 generates the score spectrogram $X'_{f,k}$, for example, using a harmonic gaussian mixture model (harmonic GMM) of the following expression.

Expression 2

$$X'_{f,k} = \sum_{r=1}^{r_k} \sum_{g=1}^{G} h(g) N(f; gF_{n_k^r}, \sigma^2) + C(f) \quad (2)$$

In the first term of the right side in Expression 2, g represents a harmonic index, that is, an index indicating a frequency component which is an integer multiple of a fundamental frequency F. g=1 represents a fundamental tone. G represents the number of harmonics (for example, 10). h(g) represents the amplitude (for example, $0.2^g$) of the g-th harmonic. $N(f; gF_{n_k^r}, \sigma^2)$ represents a normal distribution function of the frequency characteristic of power, the center frequency $gF_{n_k^r}$, and the variance $\sigma^2$. That is, the first term of the right side in Expression 2 represents components obtained by linearly combining harmonics constituting the scales based on the pure harmonic GMM. The variance $\sigma^2$ is, for example, 0.8.

In the second term of the right side in Expression 2, C(f) represents the frequency characteristic of the power of a pink noise component. The pink noise is a signal sequence indicating a random waveform having a frequency characteristic in which the power is the same in the octave bands. In the right side of Expression 2, the addition of C(f) is performed to avoid the division by zero (zero divide) which can occur at the time of processing the spectrogram expressed by the component of the first term of the right side.

C(f) represents, for example, the frequency characteristic expressed by Expression 3.

Expression 3

$$C(f) = A\exp(-\alpha f) \quad (3)$$

Here, A is a constant indicating a power ratio (for example, 5%) of the component of the first term in the right side to the component of the second term in the right side in Expression 2. α is a constant representing a reduction ratio of power. α is, for example, a value of log $10(C(f+\Delta f)/C(f))=-0.6$. Here, $\Delta f$ is the value of a frequency bin constituting the frequency-domain signal corresponding to the bandwidth of 1 kHz.

The frequency characteristic synthesizer 1051 outputs the generated score spectrogram $X'_{f,k}$ to the score position estimating unit 106.

The chroma vector calculator 1052 generates the score chroma vector $c_k^s$ based on the score information $n_k$ input from the score information input unit 104. The chroma vector generator 1052 generates the score chroma vector in which the elements $c_k^s(n)$ corresponding to the scale n included in the score information $n_k$ are set to 1 and the elements $c_k^s(n)$ corresponding to the scale n not included in the score information $n_k$ are set to zero. For example, when $n_2$ is [C, E, G], the chroma vector generator 1052 generates the chroma vector $c_2{}^s$=[1, 0, 0, 0, 1, 0, 0, 1, 0, 0, 0, 0].

The chroma vector generator 1052 outputs the generated score chroma vector $c_k{}^s$ to the score position estimating unit 106.

The score position estimating unit 106 includes a weight calculator 1061, a re-sampler 1062, a state transition portion 1063, a score position calculator 1064, and a tempo calculator 1065.

The weight calculator 1061 calculates a weight coefficient of each particle to be described later based on the sound feature quantity input from the sound feature quantity generating unit 102 and the score feature quantity. The weight calculator 1061 outputs the calculated weight coefficients of the particles to the re-sampler 1062.

Specifically, the weight calculator 1061 includes a chroma vector weight calculator 10611, a frequency characteristic weight calculator 10612, a tempo weight calculator 10613, and a particle weight calculator 10614.

The chroma vector weight calculator 10611 calculates the chroma vector weight coefficient $w^{ch}$ based on the sound chroma vector $c_t{}^a$ input from the chroma vector generator 1022 and the score chroma vector $c_{kt}{}^s$ input from the chroma vector generator 1052. The chroma vector weight coefficient $w^{ch}$ is a criterion indicating the similarity or the correlation between the sound chroma vector $c_t{}^a$ and the score chroma vector $c_{kt}{}^s$. The chroma vector weight calculator 10611 calculated the chroma vector weight coefficient $w^{ch}$, for example, using the following expression.

Expression 4

$$w^{ch} = \sum_{\tau=t-L}^{t} c_\tau^a \cdot c_{k_\tau^i}^s / L \quad (4)$$

In Expression 4, $\tau$ represents an observation time. t represents a newest frame time. $k_\tau$ represents a score frame at the observation time $\tau$. The score frame $k_\tau$ and the observation time have the following relationship expressed by Expression 5.

Expression 5

$$k_\tau = \text{floor}(k' - (k' - (k-\tau)/b' + 0.5) \quad (5)$$

In Expression 5, floor( . . . ) represents a floor function. That is, floor( . . . ) is a function of truncating a real number into the integer part. k' represents a virtual score position. b' represents a virtual beat interval. k' and b' will be described later.

That is, Expression 4 expresses that the chroma vector weight coefficient $w^{ch}$ is a value obtained by accumulating inner products of the sound chroma vector $c_t{}^a$ and the score chroma vector $c_{kt}{}^s$ while tracing back from the newest frame t by a predetermined time length L. In the following description, the time L is referred to as an observation time (window length). L is, for example, 2.5 seconds.

In Expression 4, the chroma vector weight coefficient $w^{ch}$ increases by the similarity (that is, both vectors are oriented closer to each other) between the sound chroma vector $c_t{}^a$ and the score chroma vector $c_{kt}{}^s$ and has the maximum value of 1 when the sound chroma vector $c_t{}^a$ and the score chroma vector $c_{kt}{}^s$ are matched with each other.

The chroma vector weight calculator 10611 outputs the calculated chroma vector weight coefficient $w^{ch}$ to the particle weight calculator 10614.

A virtual score position $k_i'$ and a virtual beat interval determined for each particle i to be described later are input to the chroma vector weight calculator 10611 from the state transition portion 1063. The chroma vector weight calculator 10611 shifts the start point t-L and the end point t of the observation time to times after a look-ahead time $\Delta T$ elapses, respectively. The look-ahead time $\Delta T$ is a time by which the observation time is advanced every state transition by the state transition portion 1063 and is, for example, 1 second. Accordingly, the chroma vector weight calculator 10611 shifts the observation time without changing the observation time length L. The chroma vector weight calculator 10611 calculates and outputs a chroma vector weight coefficient $w_i{}^{ch}$ based on the virtual score position $k_i'$ and the virtual beat interval $b_i'$ of each i in the above-mentioned process.

The frequency characteristic weight calculator 10612 calculates a frequency characteristic weight coefficient $w^{sp}$ based on the sound spectrogram $X'_{f,t}$ input from the frequency characteristic analyzer 1021 and the score spectrogram $X'_{f,k}$ input from the frequency characteristic synthesizer 1051. The frequency characteristic weight coefficient $w^{sp}$ is a criterion indicating the similarity or correlation between the sound spectrogram $X'_{f,t}$ and the score spectrogram $X'_{f,k}$. The frequency characteristic weight calculator 10612 sets the frequency characteristic weight coefficient $w^{sp}$, for example, based on the Kullback-Leiler divergence of the sound spectrogram $X'_{f,t}$ and the score spectrogram $X'_{f,k}$. Here, the frequency characteristic weight calculator 10612 calculates the frequency characteristic weight coefficient $w^{sp}$ using Expression 6.

Expression 6

$$w^{sp} = (1+Q)\exp(-Q) \quad (6)$$

In Expression 6, Q is a real number expressed by the following expression.

Expression 7

$$Q = \frac{1}{L} \sum_{\tau=t-L}^{t} \sum_f X_{f,\tau} \log \frac{X_{f,\tau}}{X'_{f,k_\tau}} \quad (7)$$

In Expression 7, the frequency characteristic weight calculator 10612 uses the sound spectrogram $X_{f,t}$ and the score spectrogram $X'_{f,k_\tau}$ normalized as expressed by Expression 8.

Expression 8

$$\sum_f X_{f,\tau} = \sum_f X'_{f,k_\tau} = 1 \quad (8)$$

The frequency characteristic weight calculator 10612 uses the relation between the time $\tau$ and the score frame $k\tau$ expressed by Expression 5.

In Expressions 6 and 7, the frequency characteristic weight coefficient $w^{sp}$ increases by the similarity between the sound spectrogram $X_{f,t}$ and the score spectrogram $X'_{f,k}$ and has the maximum value of 1 when both are matched with each other. In this manner, by using the frequency characteristic weight coefficient $w^{sp}$, the frequency characteristic weight calculator 10612 can satisfactorily acquire the correspondence between the input sound signal and the score information in consideration of the extension of the frequency characteristic of the input sound signal or the score information which is not expressed using only the chroma vector.

The frequency characteristic weight calculator 10612 outputs the calculated frequency characteristic weight coefficient $w^{sp}$ to the particle weight calculator 10614.

The virtual score position $k_i'$ and the virtual beat interval $b_i'$ determined for each particle i are input to the frequency characteristic weight calculator 10612 from the state transition portion 1063. At this time, the frequency characteristic weight calculator 10612 shifts the observation time later by shifting the start point t-L an the end point t of the observation time to times after the look-ahead time $\Delta T$ elapses, respectively. The frequency characteristic weight calculator 10612 calculates and outputs the frequency characteristic weight coefficient $w_i^{sp}$ based on the virtual score position $k_i'$ and the virtual beat interval $b_i'$ of each particle i in the above-mentioned process.

The tempo weight calculator 10613 calculates at tempo weight coefficient $w^t$ from the sound spectrogram $X_{f,t}$ input from the frequency characteristic analyzer 1021. The tempo weight coefficient $w^t$ is a criterion indicating the confidence of the virtual beat interval b' indicated by the input sound signal.

The tempo weight calculator 10613 calculates as the tempo weight coefficient $w^t$ a normalized cross correlation between the sound spectrogram $X_{f,t}$ shifted from the sound spectrogram $X_{f,t}$ by the virtual beat interval b'. That is, the tempo weight calculator 10613 calculates the tempo weight coefficient $w^t$ using Expression 9.

Expression 9

$$w^t = \frac{\sum_{\tau=t-L}^{t}\sum_f X_{f,\tau} X_{f,\tau-floor(b'+0.5)}}{\sqrt{\sum_{\tau=t-L}^{t}\sum_f X_{f,\tau}^2 \sum_{\tau=t-L}^{t}\sum_f X_{f,\tau-floor(b'+0.5)}^2}} \quad (9)$$

In Expression 9, when the virtual beat interval b' is equal to or greater than the look-ahead time $\Delta T$, the tempo weight calculator 10613 sets the tempo weight coefficient $w^t$ to zero.

In Expression 9, the tempo weight coefficient $w^t$ represents the correlation between the current sound spectrogram and the previous sound spectrogram. For example, the tempo weight coefficient $w^t$ of the input sound signal in which the same scale is repeatedly performed every beat interval b' with the same power is 1.

The tempo weight calculator 10613 outputs the calculated tempo weight coefficient $w^t$ to the particle weight calculator 10614.

The virtual beat interval $b_i'$ set for each particle to be described later is input to the tempo weight calculator 10613 from the state transition portion 1063. At this time, the tempo weight calculator 10613 shifts the observation time by shifting the start point t-L and the end point t of the observation time to times after the look-ahead time $\Delta T$ elapses. The tempo weight calculator 10613 calculates and outputs a tempo weight coefficient $w_i^t$ based on the virtual beat interval $b_i'$ of each particle i in the above-mentioned process.

The particle weight calculator 10614 calculates a weight coefficient $w_i$ of each particle i based on the chroma vector weight coefficient $w_i^{ch}$ input from the chroma vector weight calculator 10611, the frequency characteristic weight coefficient $w_i^{sp}$ input from the frequency characteristic weight calculator 10612, and the tempo weight coefficient $w_i^t$ input from the tempo weight calculator 10613.

The particle i is a set of the virtual score position $k_i'$ and the virtual beat interval $b_i'$ as virtual variables and the weight coefficient $w_i$ as an observed value in this embodiment. The particle is used to estimate a virtual variable from an observed value by the use of a particle filtering method. For example, in this embodiment, the estimated values of the score position k' and the beat interval b' are determined based on the virtual score position $k_i'$ and the virtual beat interval $b_i'$ of each i.

Specifically, the particle weight calculator 10614 calculates the particle weight coefficient $w_i$ of each particle i using Expression 10.

Expression 10

$$w_i = w_i^{ch} \cdot w_i^{sp} \cdot w_i^t \quad (10)$$

The particle weight calculator 10614 outputs the virtual score position the virtual beat interval $b_i'$, and the particle weight coefficient $w_i$ of each particle i to the re-sampler 1062.

The virtual score position $k_i'$, the virtual beat interval $b_i'$, and the particle weight coefficient $w_i$ of each particle i are input to the re-sampler 1062 from the particle weight calculator 10614. The re-sampler 1062 re-samples the particles based on the particle weight coefficient $w_i$ of each particle i. The re-sampler 1062 outputs the virtual score position $k_i'$ and the virtual beat interval $b_i'$ of each re-sampled particle to the state transition portion 1063. The re-sampler 1062 set the number of rejected particles and the number of particles newly generated by division or duplication to be equal to each other so as to keep the number of particles constant in the processes involved in the re-sampling.

The re-sampler 1062 re-samples the particles, for example, using an SIR (Sampling importance Re-sampling) method.

Here, the re-sampler 1062 rejects the particles i of which the weight coefficient $w_i$ is small by performing the following process. This is because the confidence of the virtual score position $k_i'$ or the virtual beat interval $b_i'$ corresponding to such particles i is low.

For example, the re-sampler 1062 normalizes the particle weight coefficient $w_i$ of each particle i using Expression 11 and calculates a normalized particle weight coefficient $p_i$.

Expression 11

$$p_i = \frac{w_i}{\sum_{i=1}^{N} w_i} \quad (11)$$

In Expression 11, N represents the number of particles (for example, 300).

The re-sampler 1062 determines whether the normalized particle weight coefficient $p_i$ is smaller than a predetermined threshold $p_{th}$ of the normalized particle weight coefficient. When it is determined that the normalized particle weight coefficient $p_i$ is smaller than the predetermined threshold $p_{th}$ the re-sampler 1062 rejects the corresponding particle i. That is, the re-sampler 1062 deletes the normalized particle weight coefficient $p_i$, the virtual score position $k_i'$, and the virtual beat interval $b_i'$ of the particle i. When it is determined that the normalized particle weight coefficient $p_i$ is equal to or greater than the predetermined threshold $p_{th}$, the re-sampler 1062 maintains the corresponding particle i. The re-sampler 1062 counts the number of rejected particles.

The re-sampler 1062 divides or duplicates the particle i having a large particle weight coefficient $w_i$ by performing the following process. This is because the confidence of the virtual score position $k_i'$ or the virtual beat interval $b_i'$ corresponding to such a particle i is high.

For example, the re-sampler 1062 renormalizes the particle weight coefficient of each particle i using Expression 12 and calculates a renormalized particle weight coefficient $q_i$.

Expression 12

$$q_i = N \cdot p_i \quad (12)$$

The re-sampler 1062 calculates the value $n_{qi}$ of an integer part (hereinafter, referred to as a renormalized integer) and the value $s_{qi}$ of a decimal part (hereinafter, referred to as renormalized decimal) of each particle of which the renormalized particle weight coefficient $w_i$ is greater than 1.

The re-sampler 1062 divide each particle i of which the renormalized integer $n_{qi}$ is equal to or greater than 2 and newly generates $n_{qi}-1$ particles j (j≠i). That is, the re-sampler 1062 sets the virtual score position $k_j'$ and the virtual beat interval $b_j'$ corresponding to the new particles j as the virtual score position $k_i'$ and the virtual beat interval $b_i'$ just before division. The re-sampler 1062 calculates the number of particles $N_s$ (hereinafter, referred to as a deficient number of particles) deficient to a predetermined number of particles N by sequentially subtracting the number of particles $n_{qi}-1$ newly generated from the number of particles rejected.

When the deficient number of particles reaches zero, the re-sampler 1062 does not perform the process of duplicating a particle to be described later. On the other hand, when the deficient number of particles is equal to or greater than 1, the re-sampler 1062 performs the process of duplicating a particle.

The re-sampler 1062 determines the particle i to be duplicated with the probability (hereinafter, referred to as duplication probability) proportional to the renormalized decimal $s_{qi}$ so that the total number of particles newly duplicated is equal to the deficient number of particles N. For example, the re-sampler 1062 determines the particles of which the duplication probability $s'_{qi}$ calculated using Expression 13 is smaller than a random number $r_i$ (here, $0<r_i<1$) as the particles to be duplicated.

Expression 13

$$s'_{qi} = \frac{N_s \cdot s_{qi}}{\sum s_{qi}} \quad (13)$$

The re-sampler 1062 newly duplicates each particle (j≠i) of the determined particles. That is, the re-sampler 1062 determines the virtual score position $k_j'$ and the virtual beat interval $b_j'$ corresponding to the new particle j as the virtual score position $k_i'$ and the virtual beat interval $b_i'$ just before the duplication.

The re-sampler 1062 finishes the above-mentioned processes and outputs the virtual score position $k_i'$ and the virtual beat interval $b_i'$ of each particle i to the state transition portion 1063.

The virtual score position $k_i'$ and the virtual beat interval $b_i'$ of each particle i are input to the state transition portion 1063 from the re-sampler 1062. The state transition portion 1063 updates the virtual score position $k_i'$ and the virtual beat interval $b_i'$, for example, using Expressions 14 and 15.

Expression 14

$$k_i' \leftarrow k_i' + \Delta T / b_i' + u \quad (14)$$

Expression 15

$$b_i' \leftarrow b_i' + v \quad (15)$$

In Expressions 14 and 15, u and v are Gaussian random variables of which the average values are zero and the variances are $\sigma_u$ and $\sigma_v$. For example, $\sigma_u$ is 1.0 and $\sigma_v$ is 0.2.

That is, Expression 14 represents that the state transition portion 1063 adds the random variable u indicating the random fluctuation distributed in a predetermined range to the advance of the score position corresponding to the virtual beat interval $b_i'$ (tempo) in the look-ahead time $\Delta T$ to update the virtual score position $k_i'$.

That is, Expression 15 represents that the state transition portion 1063 adds the random variable v indicating the random fluctuation distributed in a predetermined range to update the virtual beat interval $b_i'$.

In this manner, in this embodiment, it is possible to consider the fluctuation in tempo of a performed piece of music by independently performing the state transition for each particle i and adding the random variable distributed in a predetermined range to the state transition.

The state transition portion 1063 outputs the virtual score position $k_i'$ of each updated particle i to the weight calculator 1061 and the score position calculator 1064 and outputs the virtual beat interval $b_i'$ of each updated particle i to the weight calculator 1061 and the tempo calculator 1065.

The score position calculator 1064 calculates an estimated score position $\mu$ based on the virtual score position $k_i'$ of each particle i input from the state transition portion 1063. For example, the score position calculator 1064 sets the simple average of the virtual score position $k_i'$ to $\mu$. This embodiment is not limited to this configuration, but the score position calculator 1064 may calculate as the estimated score position $\mu$ the average of the particles in which the deviation of the virtual score position $k_i'$ is smaller than a predetermined $u_{TH}$. Accordingly, the score position calculator 1064 can consider only the particles densely distributed and can exclude the particles extremely dispersed at the time of calculating the average.

The score position calculator 1064 outputs the virtual score position $k_i'$ of each particle i and the calculated estimated score position $\mu$ to the confidence calculating unit 107 and outputs the calculated estimated score position $\mu$ to the score position output unit 108.

The confidence calculating unit 107 calculates a confidence coefficient of the estimated score position $\mu$ based on the virtual score position $k_i'$ of each particle i and the calculated estimated score position $\mu$ input from the score position calculator 1064. The confidence calculating unit 107 calculates the confidence coefficient $s^2(t)$ at the newest time t, for example, using Expression 16. The confidence coefficient $s^2(t)$ is a variance of the virtual score position $k_i'$ of the particles i and represents that the confidence of the estimated score position is lowered as the value increases.

Expression 16

$$s^2(t) = \sum_{i=1}^{N} (k_i' - \mu)^2 / N \quad (16)$$

Here, the confidence calculating unit 107 determines whether a difference (hereinafter, referred to as confidence difference) between the confidence coefficient $s^2(t)$ at the newest time and the confidence coefficient $s^2(t-I\Delta T)$ at the time $t-I\Delta T$ earlier by the predetermined number of transition times I (for example, five times) is greater than a predetermined threshold value $\gamma^{inc}$I. The confidence calculating unit 107 determines whether the confidence difference is less than a predetermined threshold $-\gamma^{dec}$I. $\gamma^{inc}$ and $\gamma^{dec}$ are any real number and both are, for example, 4.

When it is determined that the confidence difference is greater than the threshold value $\gamma^{inc}$I, the confidence calculating unit 107 outputs a score position output stop signal instructing to stop the output of the score position to the score position calculating unit 108. When it is determined that the confidence difference is less than the threshold value $-\gamma^{dec}$I, the confidence calculating unit 107 outputs a score position output start signal instructing to start the output of the score position to the score position calculating unit 108.

In the above-mentioned example, the confidence calculating unit 107 controls the output of the score position output stop signal and the score position output start signal based on the confidence difference, but this embodiment is not limited to this example. For example, confidence calculating unit 107 may determine whether the confidence coefficient $s^2(t)$ is greater than a predetermined threshold value $\gamma_s$, may output the score position output stop signal to the score position output unit 108 when it is determined that the confidence coefficient $s^2(t)$ is greater than a predetermined threshold value $\gamma_s$, and may output the score position output start signal to the score position output unit 108 when the confidence coefficient $s^2(t)$ is less than a predetermined threshold value $\gamma_s$.

The confidence calculating unit 107 may calculate the absolute value $|e(t)|$ or the square error $e^2(t)$ of an estimation error $e(t)$ of the estimated score position $\mu$ as the confidence coefficient, may determine whether the calculated confidence coefficient is greater than a predetermined threshold value $\gamma_e$, may output the score position output stop signal to the score position output unit 108 when it is determined that the calculated confidence coefficient is greater than a predetermined threshold value $\gamma_e$, and may output the score position output start signal to the score position output unit 108 when it is determined that the calculated confidence coefficient is less than a predetermined threshold value $\gamma_e$.

Here, the estimation error $e(t)$ is expressed by Expression 17.

Expression 17

$$e(t)=t+\Delta T-s(k'(t)) \quad (17)$$

In Expression 17, $s(k'(t))$ represents the ground truth time in the frame $k'(t)$. $k'(t)$ represents the estimated score position $\mu$.

The score position output unit 108 receives the estimated score position $\mu$ from the score position calculator 1064 and outputs the received estimated score position $\mu$.

However, the score position output unit 108 stops the output of the estimated score position $\mu$ when the score position output stop signal is input from the confidence calculating unit 107. On the other hand, the score position output unit 108 restarts the stopped output of the estimated score position $\mu$ when the score position output start signal is input from the confidence calculating unit 107.

Accordingly, in this embodiment, it is possible to avoid the output of the estimated score position $\mu$ with low confidence.

The tempo calculator 1065 calculates an estimated beat interval β based on the virtual beat interval $b_i'$ of each particle i input from the state transition portion 1063. The estimated beat interval is a criterion indicating the tempo of a piece of music in a performance. For example, the tempo calculator 1065 sets the simple average of the virtual beat interval $b_i'$ as β. This embodiment is not limited to this example, but the tempo calculator 1065 may calculate the average of the particles in which the deviation of the virtual beat interval $b_i'$ is smaller than a predetermined threshold $v_{TH}$ as the estimated beat interval β. Accordingly, the tempo calculator 1065 can consider only the particles densely distributed and can exclude the particles extremely dispersed at the time of calculating the average value.

The tempo calculator 1065 outputs the estimated beat interval β to the tempo output unit 109.

The tempo output unit 109 receives the estimated beat interval β from the tempo calculator 1065 and outputs the received estimated beat interval β to the outside of the musical score position estimating apparatus 1.

A robot can use the output estimated score position $\mu$ and the output estimated beat interval β to synthesize singing voices or to control the position of a mechanism unit and can synchronize the synthesized singing voice or the operation of the mechanism unit with a piece of music in a performance. The score position estimating procedure according to this embodiment can be applied to a robot synthesizing singing voices or controlling a moving mechanism in response to a piece of music in a performance and the like. The robot can solve the essential problem with a delay to such an application by using the estimated score position according to this embodiment.

The musical score position estimating apparatus 1 outputs the estimated score position $\mu$ and the estimated beat interval β together, enters a state (rhythm level) where the output of the estimated score position $\mu$ is stopped when the increase in confidence of the estimated score position is greater than a predetermined threshold, and enters a state (melody level) where the output of the estimated score position $\mu$ is restarted when the increase in confidence of the estimated score position is less than a predetermined threshold. Accordingly, in this embodiment, since the estimated score position having a low confidence is not output, it is possible to avoid the operation not intended by a user in synthesizing singing voices or controlling the position of the mechanism unit.

The score position estimating procedure according to this embodiment will be described with reference to the drawings.

Figure 2:
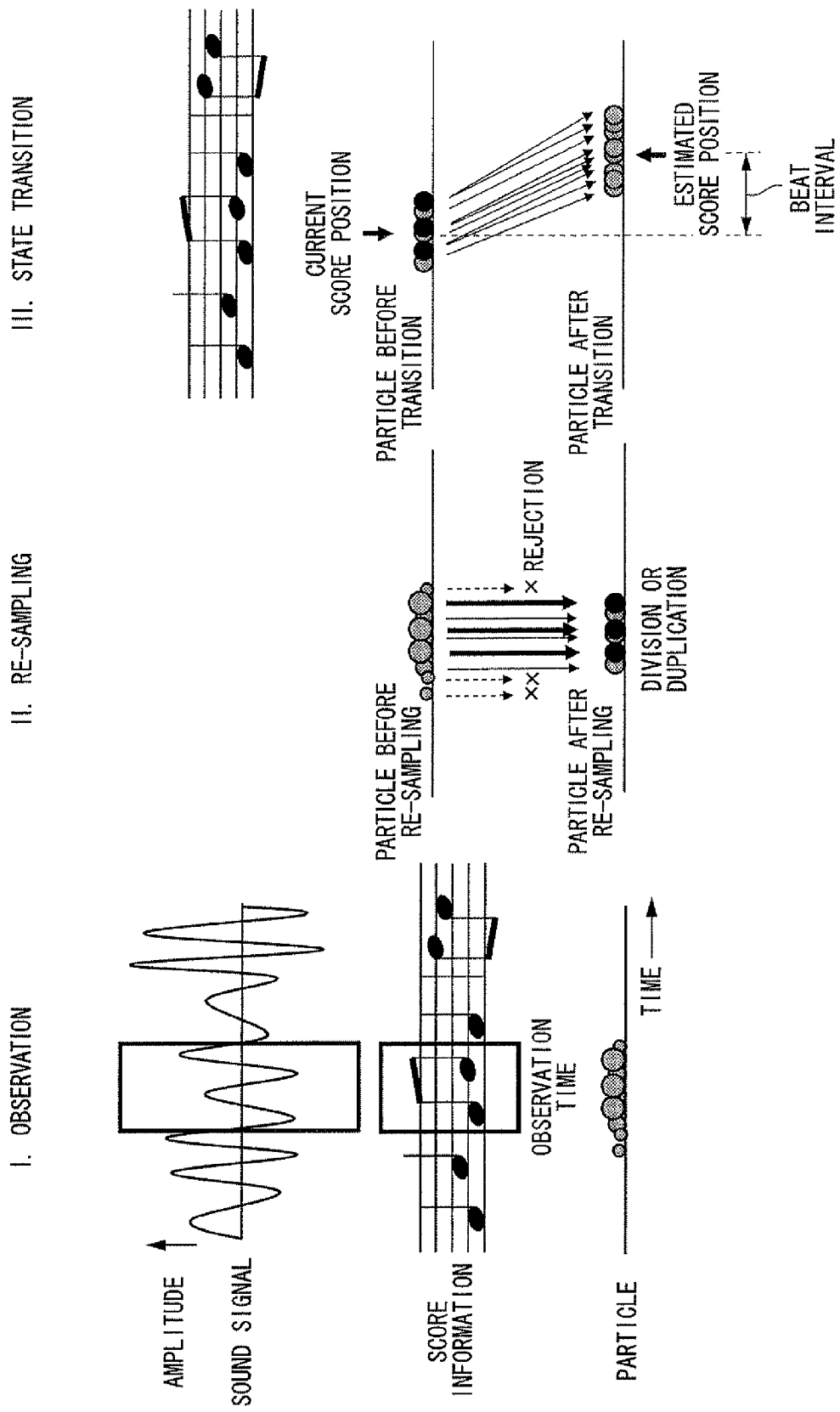
FIG. 2 is a conceptional diagram schematically illustrating the outline of the musical score position estimating procedure according to the first embodiment.

FIG. 2 is a diagram schematically illustrating the score position estimating procedure according to this embodiment. The left column in FIG. 2 shows observation (I.), the middle column shows re-sampling process (II.), and the right column shows the state transition process (III.). A series of processes including these processes are included in the particle filtering procedure.

In the left column of FIG. 2, a sound signal, score information, a particle distribution are sequentially shown from the upper stage to the lower stage. In the stages, the horizontal axis represents time. The vertical axis of the upper stage represents the amplitude and the waveform of the sound signal is shown. The middle stage shows score information on a staff using notes. The lower stage shows the distribution of particles at virtual score positions using circles. The radii of the circles represent the magnitudes of the weight coefficients of the particles.

The rectangular frames shown in the upper stage and the middle stage represent the observation time to observe the sound signal and the score information.

Therefore, the left column of FIG. 2 represents that the weight coefficient is calculated for each particle based on the sound feature quantity and the score feature quantity in the observation process (I.).

In the middle column of FIG. 2, the middle stage shows the distribution of particles before the re-sampling and the lower stage shows the distribution of particles after the re-sampling. Here, the distribution of particles before the re-sampling is the same as shown in the lower stage of the left column in the drawing. The broken-line arrows directed from the particles before the re-sampling to the lower stage and the marks x show that the particles are rejected. The thin sold arrows directed from the particles before the re-sampling to the particles after the re-sampling show that the particles are maintained. The thick solid arrows directed from the particles before the re-sampling to the particles after the re-sampling show that the particles are divided or duplicated to generate particles having the same virtual score information.

Therefore, the second column of FIG. 2 represents that the same number of new particles as the number of rejected particles are generated by rejecting the particles having a small weight coefficient and dividing or duplicating the particles having a large weight coefficient in the re-sampling.

In the right column of FIG. 2, the score position, the distribution of particles before the state transition, and the distribution of particles after the state transition are sequentially shown from the upper stage to the lower stage. Here, the score information is the same as shown in the middle stage of the left column in the drawing. The distribution of particles before the state transition is the same as shown in the lower stage of the middle column in the drawing. The arrow directed downward from the middle stage represents that the center of the distribution of particles is located at the current score position. The arrow directed upward from the lower stage represents that the center of the distribution of particles is located at the estimated score position. Here, the right column of FIG. 2 shows that the interval between the current score position and the estimated score position is the beat interval. The arrows directed from the particles in the middle stage to the lower stage show that the particles transitions to the score positions indicated by the arrows.

Therefore, the right column of FIG. 2 represents that the virtual score position of each particle in the state transition is updated and the score position is estimated based on the distribution of the updated virtual score positions.

Figure 3:
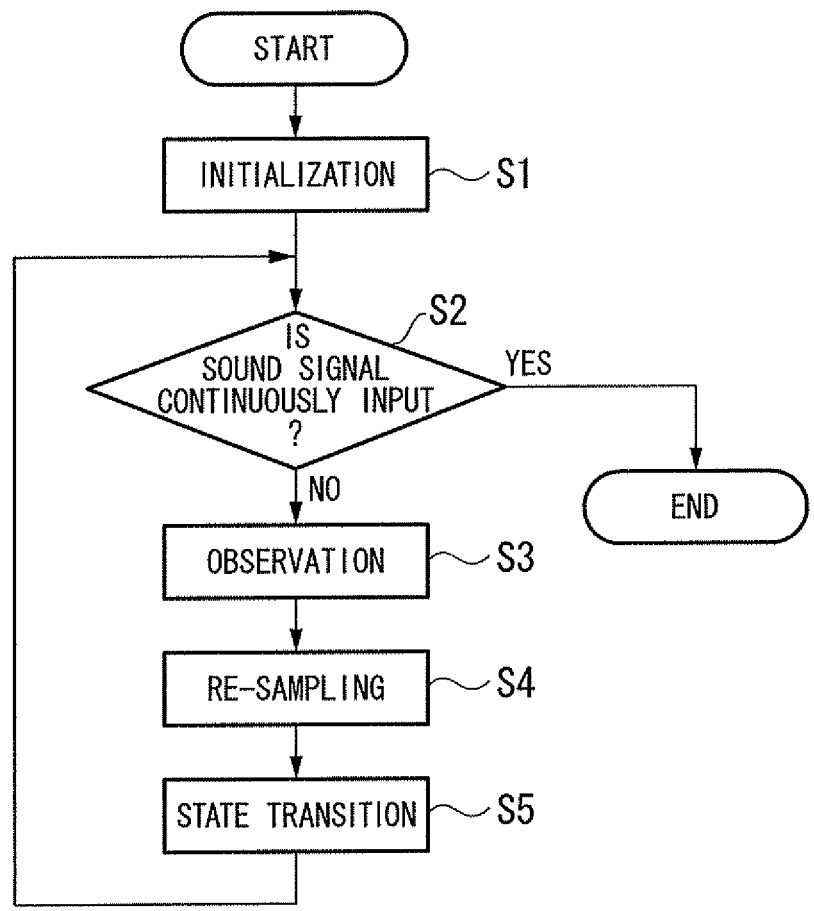
FIG. 3 is a flowchart schematically illustrating the outline of the musical score position estimating procedure according to the first embodiment.

FIG. 3 is a flowchart schematically illustrating the outline of the score position estimating procedure according to this embodiment.

(Step S1) The constituent units of the musical score position estimation apparatus 1 initialize variables and data used in the procedure.

(Step S2) The sound signal input unit 101 receives a sound signal and determines whether the sound signal is continuously input. When the sound signal input unit 101 determines that the sound signal is continuously input (YES in Step S2), the process flow goes to Step S3. When the sound signal input unit 101 determines that the sound signal is not continuously input (NO in Step S2), the procedure is ended.

(Step S3) The sound feature quantity generating unit 102 generates a feature quantity based on the input sound signal. The weight calculator 1061 calculates a weight coefficient of each particle from the feature quantities generated based on the sound signal and the feature quantity based on score information. (I. Observation)

(Step S4) The re-sampler 1062 rejects the particles of which the weight coefficient is smaller than a predetermined value and divides or duplicates the particles of which the weight coefficient is greater than a predetermined value. (II. Re-sampling)

(Step S5) The state transition portion 1063 updates the virtual score position and the virtual beat interval of each particle. The score position calculator 1064 calculates the estimated score position based on the updated virtual score position. The tempo calculator 1065 calculates the estimated beat interval based on the updated virtual beat interval. (III. State Transition)

The details of the score position estimating procedure according to this embodiment will be described with reference to the drawings.

Figure 4:
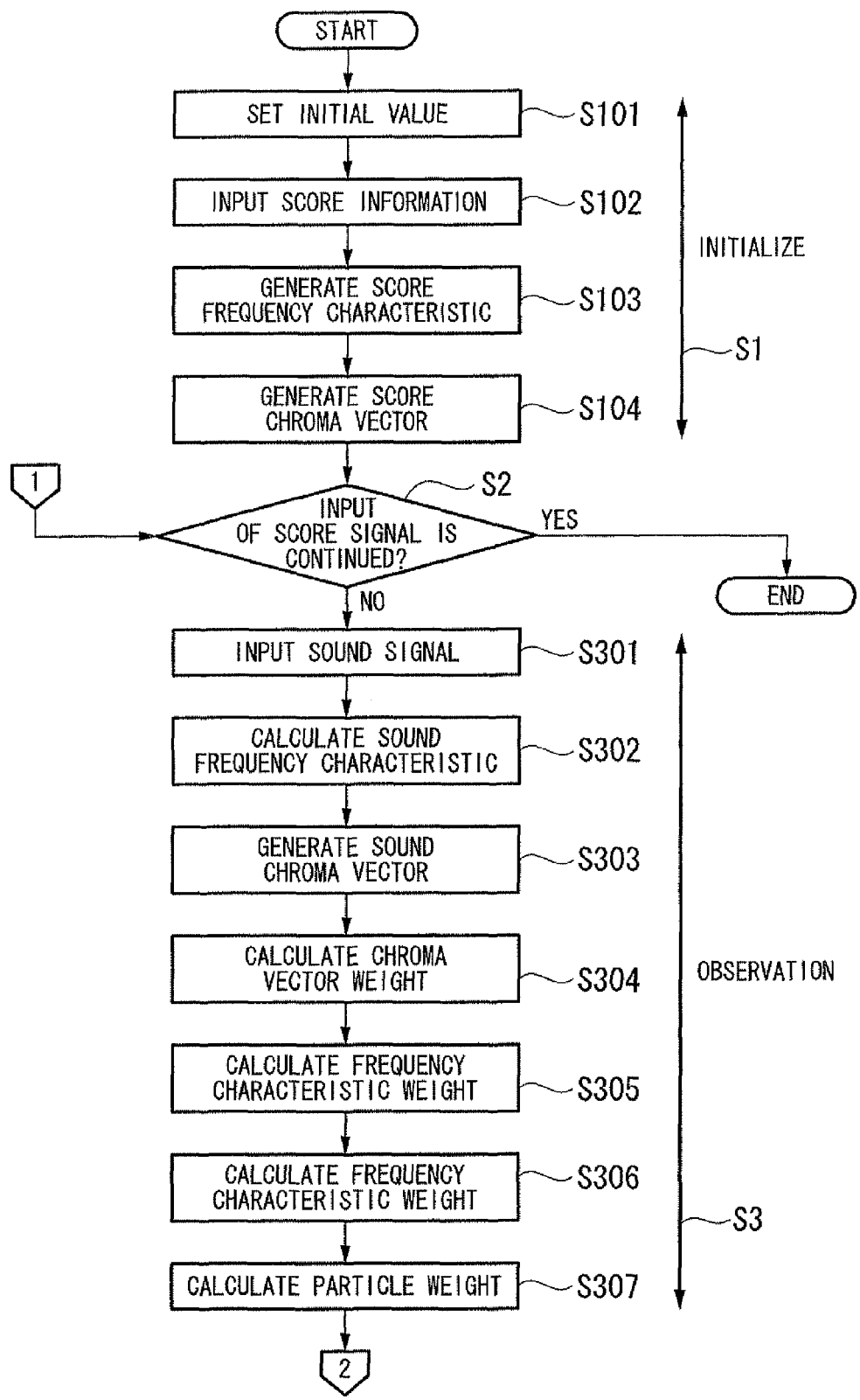
FIG. 4 is a flowchart schematically illustrating a part of the score position estimating procedure according to the first embodiment.

FIG. 4 is a flowchart illustrating a part of the score position estimating procedure according to this embodiment.

The procedure shown in FIG. 4 includes the initialization process (Step S1), the process of determining the continuous input of a sound signal (Step S2), and the observation process (Step S3).

The initialization process (Step S1) includes Steps S101 to S104.

(Step S101) The constituent units of the musical score position estimating apparatus 1 initialize variables and data used in the procedure. For example, the weight calculator 1061 initializes the virtual beat interval $b_i'$ of each particle i, the virtual score position $k_i'$ of each particle i, and the variances $\sigma_u$ and $\sigma_v$.

The weight calculator 1061 sets the initial value of the virtual beat interval $b_i'$ of each particle i to, for example, a beat interval 60/x corresponding to the tempos x. The tempos x are uniformly distributed between 60 bpm (beat per minute) and 180 bpm.

The weight calculator 1061 sets the initial value of the virtual score position $k_i'$ of each particle i to, for example, $\Delta T/b_i'$ The weight calculator 1061 initially sets the look-ahead time $\Delta T$ to, for example, 1 second. Thereafter, the process flow goes to Step S102.

(Step S102) The score information input unit 104 reads the score information $n_k$ of a tune to be processed from the score position storage unit 103. The score position input unit 104 outputs the read score information $n_k$ to the score feature quantity generating unit 105. Thereafter, the process flow goes to Step S103.

(Step S103) The frequency characteristic synthesizer 1051 of the score feature quantity generating unit 105 calculates, for example, a score spectrogram $X'_{f,k}$ as the score feature quantity based on the score information $n_k$ input from the score information input unit 104. The frequency characteristic synthesizer 1051 uses, for example, the harmonic GMM expressed by Expression 2 at the time of calculating the score spectrogram $X'_{f,k}$.

The frequency characteristic synthesizer 1051 may calculate the score spectrogram $X'_{f,k}$ of the entire score information $n_k$ of the tune. The score spectrogram $X'_{f,k}$ calculated in advance may be stored in the score information storage unit 103 and the frequency characteristic synthesizer 1051 may read the score spectrogram $X'_{f,k}$ from the score information storage unit 103.

The frequency characteristic synthesizer 1051 outputs the generated or read score spectrogram $X'_{f,k}$ to the score position estimating unit 106. Thereafter, the process flow goes to Step S104.

(Step S104) The chroma vector generator 1052 of the score feature quantity generating unit 105 generates the score chroma vector $c_k^s$ as the score feature quantity based on the score information $n_k$ input from the score information input unit 104.

The chroma vector generator 1052 may generate the score chroma vector $c_k^s$ of the entire score information $n_k$ of the tune. The score chroma vector $c_k^s$ generated in advance may be stored in the score information storage unit 103 and the chroma vector generator 1052 may read the score chroma vector $c_k^s$ from the score information storage unit 103.

The chroma vector generator 1052 outputs the generated or read score chroma vector $c_k^s$ to the score position estimating unit 106. Thereafter, the process flow goes to Step S2.

(Step S2) The sound signal input unit 101 receives a sound signal and determines whether a sound signal is continuously input. When the sound signal input unit 101 determines that a sound signal is continuously input (YES in Step S2), the process flow goes to Step S301. When the sound signal input unit 101 determines that a sound signal is not continuously input (NO in Step S2), the procedure is ended.

The observation process (Step S3) includes Steps S301 to S307.

(Step S301) The sound signal input unit 101 receives an analog sound signal and converts the received analog sound signal into a digital sound signal. The sound signal input unit 101 outputs the digital sound signal to the sound feature quantity generating unit 102. Thereafter, the process flow goes to Step S302.

(Step S302) The frequency characteristic analyzer 1021 transforms the digital sound signal input from the sound signal input unit 101 from a time-domain signal to a frequency-domain signal. The frequency characteristic analyzer 1021 calculates the amplitude of transformed frequency-domain signal as the sound spectrogram $X_{f,t}$ and outputs the sound spectrogram $X_{f,t}$ to the chroma vector generator 1022 and the score position estimating unit 106. Thereafter, the process flow goes to Step S303.

(Step S303) The chroma vector generator 1022 calculates the sound chroma vector from the sound spectrogram $X_{f,t}$ input from the frequency characteristic analyzer 1021. Here, the chroma vector generator 1022 calculates, for example, elements $c_t^a(n)$ of the scales n of the sound chroma vector $c_t^a$ using Expression 1.

The chroma vector generator 1022 outputs the calculated sound chroma vector $c_t^a$ to the score position estimating unit 106. Thereafter, the process flow goes to Step S304.

(Step S304) The chroma vector weight calculator 10611 calculates the chroma vector weight coefficient $w^{ch}$ from the sound chroma vector $c_t^a$ input from the chroma vector generator 1022 and the score chroma vector $c_{k,t}^s$ input from the chroma vector generator 1052. Here, the chroma vector weight calculator 10611 calculates the chroma vector weight coefficient $w_i^{ch}$ of each particle i based on the virtual score position and the virtual beat interval $b_i'$ of each particle i input from the state transition portion 1063, for example, using Expressions 4 and 5.

The chroma vector weight calculator 10611 outputs the calculated chroma vector weight coefficient $w^{ch}$ of each particle i to the particle weight calculator 10614. Thereafter, the process flow goes to Step S305.

(Step S305) The frequency characteristic weight calculator 10612 calculates the frequency characteristic weight calculator $w^{sp}$ from the sound spectrogram $X_{f,t}$ input from the frequency characteristic analyzer 1021 and the score spectrogram $X'_{f,k}$ input from the frequency characteristic synthesizer 1051. Here, the frequency characteristic weight calculator 10612 calculates the frequency characteristic weight calculator $w^{sp}$ of each particle i based on the virtual score position $k_i'$ and the virtual beat interval $b_i'$ of each particle i input from the state transition portion 1063, for example, using Expressions 5 to 8.

The frequency characteristic weight calculator 10612 outputs the calculated frequency characteristic weight calculator $w_i^{sp}$ of each particle i to the particle weight calculator 10614. Thereafter, the process flow goes to Step S306.

(Step S306) The tempo weight calculator 10613 calculates the tempo weight coefficient $w^t$ from the sound spectrogram $X_{f,t}$ input from the frequency characteristic analyzer 1021. Here, the tempo weight calculator 10613 calculates the tempo weight coefficient $w^t$ of each particle i based on the virtual beat interval $b_i'$ of each particle i input from the state transition portion 1063, for example, using Expression 9.

The tempo weight calculator 10613 outputs the calculated tempo weight coefficient $w_i^t$ of each particle i to the particle weight calculator 10614. Thereafter, the process flow goes to Step S307.

(Step S307) The particle weight calculator 10614 calculates the particle weight coefficient $w_i$ of each particle i from the chroma vector weight coefficient $w_i^{ch}$ input from the chroma vector weight calculator 10611, the frequency characteristic weight calculator $w_i^{sp}$ input from the frequency characteristic weight calculator 10612, and the tempo weight coefficient $w_i^t$ input form the tempo weight calculator 10613. Here, the particle weight calculator 10614 uses, for example, Expression 10 at the time of calculating the particle weight coefficient $w_i$.

The particle weight calculator 10614 outputs the virtual score position the virtual beat interval $b_i'$, and the particle weight coefficient w, of each particle i to the re-sampler 1062. Thereafter, the process flow goes to Step S411.

Figure 5:
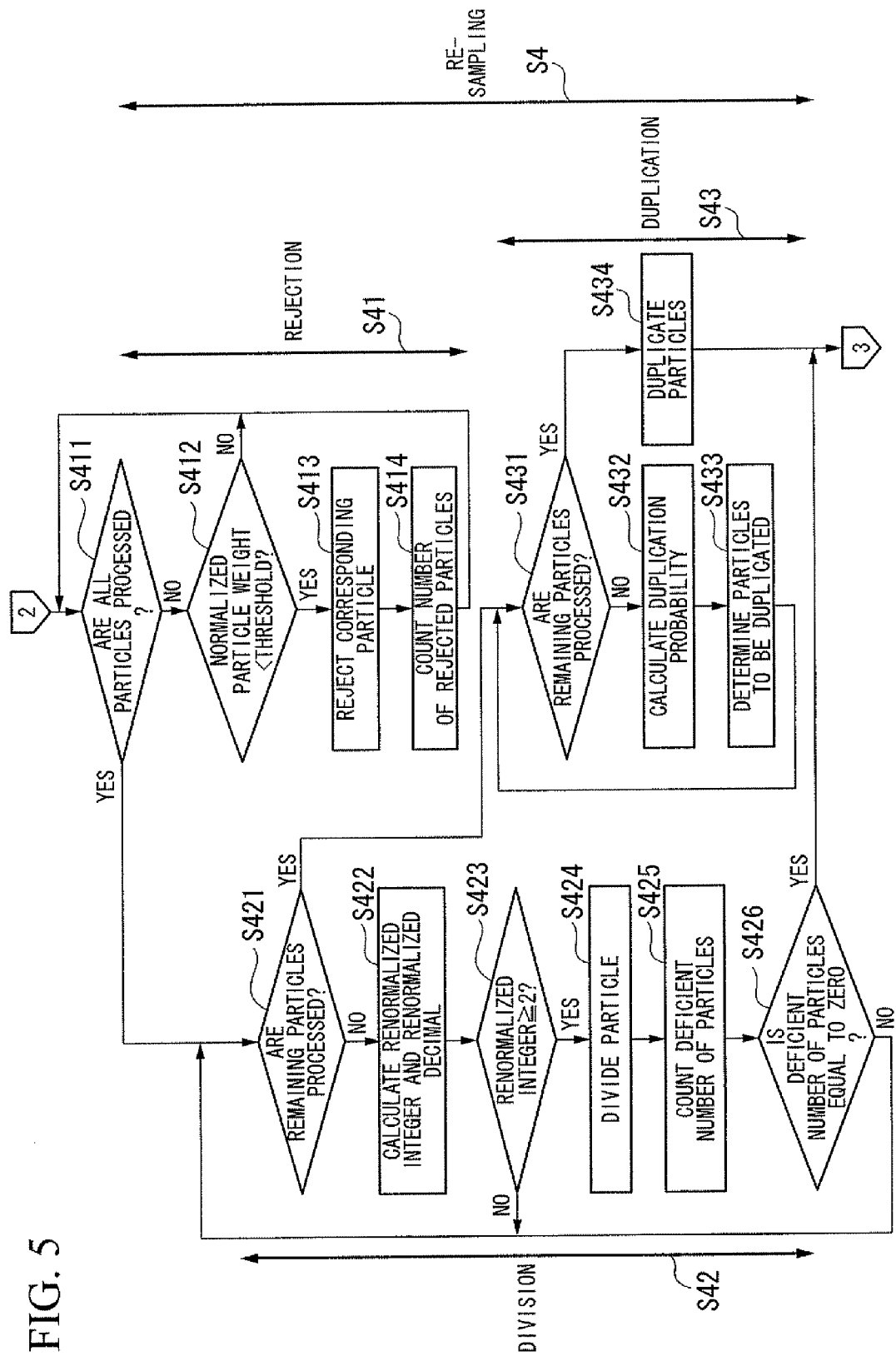
FIG. 5 is a flowchart schematically illustrating another part of the score position estimating procedure according to the first embodiment.

FIG. 5 is a flowchart illustrating another part of the score position estimating procedure according to this embodiment. The procedure shown in FIG. 5 includes the re-sampling process (Step S4). The re-sampling process (Step S4) includes a rejection process (Step S41), a division process (Step S42), and a duplication process (Step S43).

The rejection process (Step S41) includes Steps S411 to S414.

(Step S411) The re-sampler 1062 receives the virtual score position $k_i'$, the virtual beat interval $b_i'$, and the particle weight coefficient $w_i$ of each particle i from the particle weight calculator 10614.

The re-sampler 1062 determines whether the processes of Steps S412 to S414 are performed on all the particles i. When the re-sampler 1062 determines that the processes of Steps S412 to S414 are performed on all the particles i (YES in Step S411), the process flow goes to Step S421. When the re-sampler 1062 determines that the processes of Steps S412 to S414 are not performed on all the particles i (NO in Step S411), the process flow goes to Step S412.

(Step S412) The re-sampler 1062 calculates the normalized particle weight coefficient $p_i$ from the particle weight coefficient $w_i$ of each particle i, for example, using Expression 11. The re-sampler 1062 determines whether the normalized particle weight coefficient $p_i$ is smaller than a predetermined threshold value $p_{th}$. When the re-sampler 1062 determines that the normalized particle weight coefficient $p_i$ is smaller than a predetermined threshold value $p_{th}$ (YES in Step S411), the process flow goes to Step S413. When the re-sampler 1062 determines that the normalized particle weight coefficient $p_i$ is equal to or greater than a predetermined threshold value $p_{th}$ (NO in Step S411), the corresponding particle i is maintained and the process flow goes to Step S411.

(Step S413) The re-sampler 1062 rejects the particle i of which the normalized particle weight coefficient $p_i$ is determined as being smaller than the predetermined threshold value $p_{th}$. Thereafter, the process flow goes to Step S414.

(Step S414) The re-sampler 1062 increases the number of particles by 1 and counts the number of rejected particles. Thereafter, the process flow goes to Step S411.

The division process (Step S42) includes Steps S421 to S426.

(Step S421) The re-sampler 1062 determines whether the processes of Steps S422 to S426 are performed on the remaining particles i not rejected. When the re-sampler 1062 determines that the processes of Steps S422 to S426 are performed on the remaining particles i not rejected (YES in Step S421), the process flow goes to Step S431. When the re-sampler 1062 determines that the processes of Steps S422 to S426 are not performed on the remaining particles i not rejected (NO in Step S421), the process flow goes to Step S422.

(Step S422) The re-sampler 1062 calculates the renormalized particle weight coefficient $q_i$ from the normalized particle weight coefficient $p_i$ of each particle i, for example, using Expression 12. The re-sampler 1062 calculates the renormalized integer $n_{qi}$ and the renormalized decimal $s_{qi}$ of the particles of which the renormalized particle weight coefficient $q_i$ is greater than 1. Thereafter, the process flow goes to Step S423.

(Step S423) The re-sampler 1062 determines whether the renormalized integer $n_{qi}$ is equal to or greater than 2. When the re-sampler 1062 determines that the renormalized integer $n_{qi}$ is equal to or greater than 2 (YES in Step S423), the process flow goes to Step S424. When the re-sampler 1062 determines that the renormalized integer $n_{qi}$ is 1 (NO in Step S423), the process flow goes to Step S421.

(Step S424) The re-sampler 1062 divides the particles i to newly generate $n_{qi}-1$ particles j (j≠i). That is, the re-sampler 1062 determines the virtual score position and the virtual beat interval $b_j'$ corresponding to the new particles j as the virtual score position $k_i'$ and the virtual beat interval $b_i'$ before the division. Thereafter, the process flow goes to Step S425.

(Step S425) The re-sampler 1062 subtracts the number of particles $n_{qi}-1$ newly generated from the deficient number of particles $N_s$ (of which the initial value is the number of rejected particles) and counts the deficient number of particles. Thereafter, the process flow goes to Step S426.

(Step S426) The re-sampler 1062 determines whether the deficient number of particles $N_s$ reaches zero. When the re-sampler 1062 determines that the deficient number of particles $N_s$ reaches zero (YES in Step S426), the re-sampling process is ended and the virtual score position $k_i'$ and the virtual beat interval $b_i'$ of each particle i are output to the state transition portion 1063. Thereafter, the process flow goes to step S501. When it is determined that the deficient number of particles $N_s$ does not reach zero (NO in step S426), the process flow goes to step S421.

The duplication process (Step S43) includes Steps S431 to S434.

(Step S431) The re-sampler 1062 determines whether the processes of Steps S432 to S433 are performed on the remaining particles i not rejected. When the re-sampler 1062 determines that the processes of Steps S432 to S433 are performed on all the remaining particles i (YES in Step S431), the process flow goes to Step S434. When the re-sampler 1062 determines that the processes of Steps S432 to S433 are not performed on all the remaining particles i (NO in Step S431), the process flow goes to Step S432.

(Step S432) The re-sampler 1062 calculates the duplication probability $s'_{qi}$, proportional to the renormalized decimal $s'_{qi}$, for example, using Expression 13. Thereafter, the process flow goes to Step S433.

(Step S433) The re-sampler 1062 determines the particles to be duplicated so that the total number of particles newly duplicated is equal to the deficient number of particles $N_s$ based on the duplication probability $s'_{qi}$. Thereafter, the process flow goes to Step S431.

(Step S434) The re-sampler 1062 duplicates a particle j (j≠i) from each of the determined particles. That is, the re-sampler 1062 determines the virtual score position $k_j'$ and the virtual beat interval $b_j'$ corresponding to the new particle j as the virtual score position $k_i'$ and the virtual beat interval $b_i'$ before the duplication.

The re-sampler 1062 outputs the virtual score position $k_i'$ and the virtual beat interval $b_i'$ of each particle i to the state transition portion 1063. Thereafter, the process flow goes to Step S501.

Figure 6:
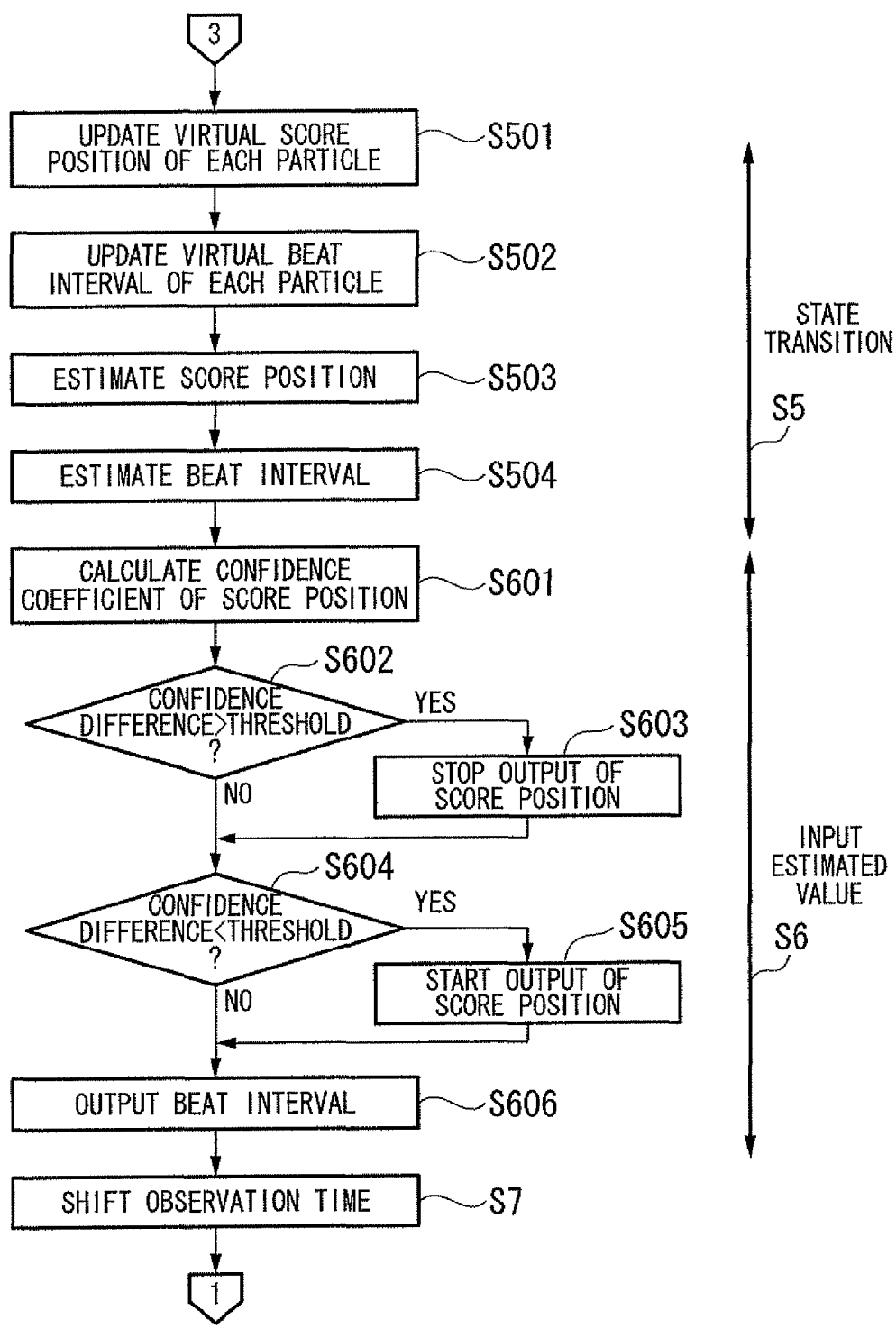
FIG. 6 is a flowchart schematically illustrating the other part of the score position estimating procedure according to the first embodiment.

FIG. 6 is a flowchart illustrating the other part of the score position estimating procedure according to this embodiment. FIG. 6 includes the state transition process (Step S5) and the estimated value output process (Step S6). The state transition process (Step S5) includes Steps S501 to S504.

(Step S501) The state transition portion 1063 receives the virtual score position $k_i'$ and the virtual beat interval $b_i'$ of each particle i from the re-sampler 1062. The state transition portion 1063 adds the random variable u to the score position advanced by the virtual beat interval $b_i'$ (tempo) in the look-ahead time $\Delta T$ to update the virtual score position $k_i'$. The state transition portion 1063 uses, for example, Expression 14 at the time of updating the virtual score position $k_i'$. Thereafter, the process flow goes to Step S502.

(Step S502) The state transition portion 1063 adds the random variable v to update the virtual beat interval $b_i'$. The state transition portion 1063 uses, for example, Expression 15 at the time of updating the virtual beat interval $b_i'$. The state transition portion 1063 outputs the updated virtual score position $k_i'$ and the updated virtual beat interval $b_i'$ of each particle i to the weight calculator 1061. The state transition portion 1063 outputs the updated virtual score position $k_i'$ of each particle i to the score position calculator 1064. The state transition portion 1063 outputs the updated virtual beat interval $b_i'$ of each particle i to the tempo calculator 1065. Thereafter, the process flow goes to Step S503.

(Step S503) The score position calculator 1064 calculates the estimated score position μ a based on the virtual score position $k_i'$ of each particle i input from the state transition portion 1063. The score position calculator 1064 sets, for example, the simple average of the virtual score position $k_i'$ as The score position calculator 1064 outputs the virtual score position $k_i'$ of each particle i and the calculated estimated score position μ to the confidence calculating unit 107. The score position calculator 1064 outputs the calculated estimated score position μ to the score position output unit 108. Thereafter, the process flow goes to Step S503.

(Step S504) The tempo calculator 1065 calculates the estimated beat interval β based on the virtual beat interval $b_i'$ of each particle i input from the state transition portion 1063. The tempo calculator 1065 sets, for example, the simple average of the virtual beat interval $b_i'$ as β.

The tempo calculator 1065 outputs the estimated beat interval β to the tempo output unit 109. Thereafter, the process flow goes to Step S601.

The estimated output process (Step S6) includes Steps S601 to S606.

(Step S601) The confidence calculating unit 107 calculates the estimated score position μ based on the virtual score position $k_i'$ of each particle i input from the score position calculator 1064. The confidence calculating unit 107 calculates the confidence coefficient $s^2(t)$ of the estimated score position μ based on the virtual score position $k_i'$ and the estimated score position μ. The confidence calculating unit 107 uses, for example, Expression 16 at the time of calculating the confidence coefficient $s^2(t)$. Thereafter, the process flow goes to step S602.

(Step S602) The confidence calculating unit 107 determines whether the confidence difference is greater than a predetermined threshold value $\gamma^{inc}I$. When the confidence calculating unit 107 determines that the confidence difference is greater than the predetermined threshold value $\gamma^{inc}I$ (YES in Step S602), the process flow goes to Step S603. When the confidence calculating unit 107 determines that the confidence difference is not greater than the predetermined threshold value $\gamma^{inc}I$ (NO in Step S602), the process flow goes to Step S604.

(Step S603) The confidence calculating unit 107 outputs the score position output stop signal to the score position output unit 108. Here, the score position output unit 108 receives the estimated score position μ from the score position calculator 1064 and outputs the received estimated score position μ. When the score position output stop signal is input from the confidence calculating unit 107, the score position output unit 108 stops the output of the estimated score position μ. Thereafter, the process flow goes to Step S604.

(Step S604) The confidence calculating unit 107 determines whether the confidence difference is less than a predetermined threshold value $\gamma^{dec}I$. When the confidence calculating unit 107 determines that the confidence difference is less than the predetermined threshold value $\gamma^{dec}I$ (YES in Step S604), the process flow goes to Step S605. When the confidence calculating unit 107 determines that the confidence difference is less than the predetermined threshold value $\gamma^{dec}I$ (NO in Step S604), the process flow goes to Step S606.

(Step S605) The confidence calculating unit 107 outputs the score position output start signal to the score position output unit 108. When the score position output start signal is input from the confidence calculating unit 107, the score position output unit 108 restarts the stopped output of the estimated score position μ. Thereafter, the process flow goes to Step S606.

(Step S606) The tempo output unit 109 receives the estimated beat interval β from the tempo calculator 1065 and outputs the received estimated beat interval β. Thereafter, the process flow goes to Step S7.

(Step S7) The weight calculator 1061 receives the virtual score position $k_i'$ and the virtual beat interval $b_i'$ of each particle i from the state transition portion 1063. The chroma vector weight calculator 10611 shifts the start point t-L and the end point t of the observation time to the times after the look-ahead time ΔT elapses to shift the observation time.

The weight calculator 1061 sets the received virtual score position $k_i'$, the received virtual beat interval $b_i'$, and the observation time to the chroma vector weight calculator 10611 and the frequency characteristic weight calculator 10612. The weight calculator 1061 outputs the received virtual beat interval $b_i'$ and the observation time to the tempo weight calculator 10613. The weight calculator 1061 outputs the received virtual score position $k_i'$ and the received virtual beat interval $b_i'$ to the particle weight calculator 10614. Thereafter, the process flow goes to Step S2.

An example of a score position estimated by the musical score position estimating apparatus 1 according to this embodiment will be described with reference to the accompanying drawings. FIGS. 7 to 14 show the operation results of the musical score position estimating apparatus 1 when the number of particles is 300, so far as it is not mentioned differently.

Figure 7:
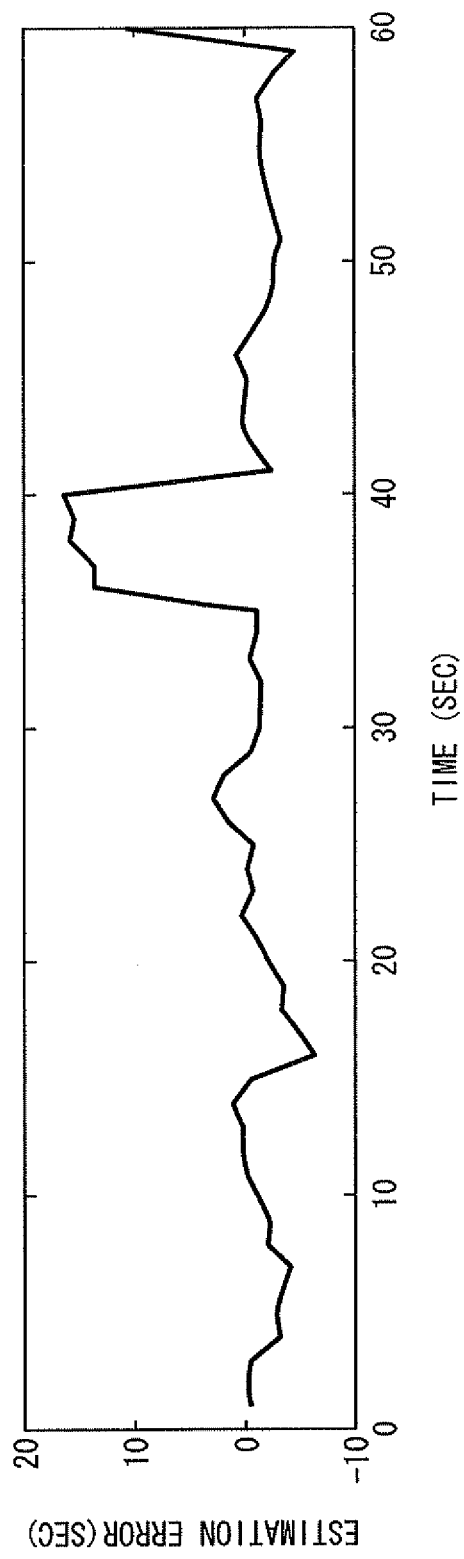
FIG. 7 is a diagram illustrating an example of an estimation error of a musical score position according to the first embodiment.

FIG. 7 is a diagram illustrating an example of an estimation error of a score position according to this embodiment. In FIG. 7, the vertical axis represents the estimation error (second) of a score position and the horizontal axis represents the time (second).

As shown in FIG. 7, the estimation error around the time of 0 to 10 seconds or 20 to 30 seconds is substantially less than ±3 seconds. The estimation error around the time of 35 to 40 seconds is greater than that around the time of 15 seconds. The estimation error in the time range of 41 to 50 seconds is substantially less than ±3 seconds.

Figure 8:
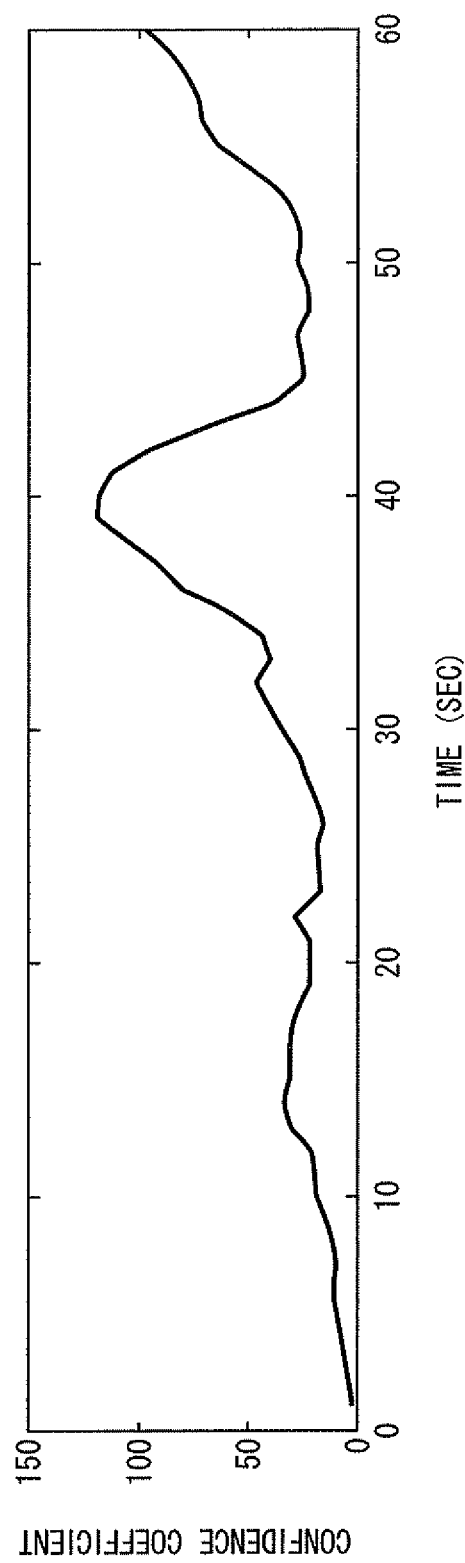
FIG. 8 is a diagram illustrating an example of confidence according to the first embodiment.

FIG. 8 is a diagram illustrating an example of a confidence coefficient according to this embodiment. In FIG. 8, the vertical axis represents the confidence coefficient and the horizontal axis represents the time (second). As shown in FIG. 8, the confidence coefficient around the time of 0 to 10 seconds or 20 to 30 seconds is substantially less than 20. In consideration of the result shown in FIG. 7, it means that the particles converge on a correct score position. On the other hand, the confidence coefficient around the time of 35 to 40 seconds increases from about 60 to 100. This result means that the increase of the confidence coefficient is caused by the accumulation of the estimation error. As shown in FIG. 8, the confidence coefficient around the time of 41 to 50 seconds decreases. This decrease means that the particles converge on a correct score position.

Therefore, in this embodiment, when the confidence calculating unit 107 detects that the confidence difference is equal to or greater than a predetermined threshold value, it is possible to stop the output of the estimated score position causing a great estimation error. When the confidence calculating unit 107 detects that the confidence difference is equal to or less than a predetermined threshold value, it is possible to restart the output of the estimated score position having a small estimation error. Accordingly, it is proved that it is possible to avoid the output of the estimated score position having a great estimation error.

Figure 9:
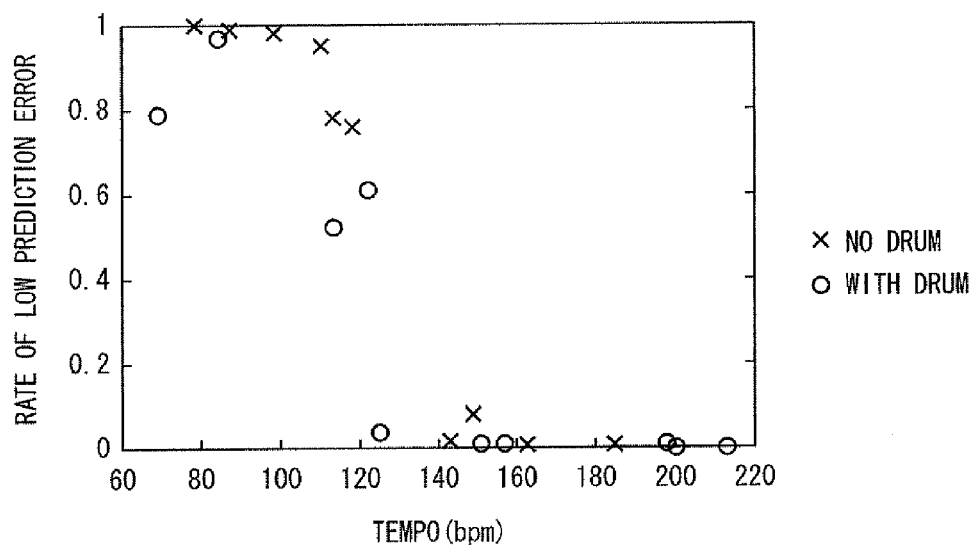
FIG. 9 is a diagram illustrating an example of a rate at which the estimation error is generated according to the first embodiment.

FIG. 9 is a diagram illustrating an example of a rate at which the estimation error is generated according to this embodiment. In FIG. 9; the rate (hereinafter, referred to as a rate of low prediction estimation error) at which the absolute value of the estimation error is less than 1 second and the horizontal axis represents the tempo (bpm). In FIG. 9, o and x represent the rate of low prediction estimation error at each tempo in a tune in a performance. Here, o indicates a tune including a drum sound and x indicates a tune not including a drum sound.

As can be seen from FIG. 9, the rate of low prediction estimation error is higher than 0.9 and the score position is estimated with high precision in the most part of the tunes having a tempo equal to or less than 110 bpm. On the other hand, as can be seen from FIG. 9, the rate of low prediction estimation error at the tempo equal to or higher than 120 bpm is lower than 0.1 and the score position is not estimated well. The reason is that because the beat interval b is equal to or less than 0.5 second at a tempo of 120 bpm or higher, two or more peaks with the tempo weight coefficient $w^t$ (see Expression 9) exist within the look-ahead time ΔT. That is, the tempo weight coefficient $w^t$ is not determined uniquely, which is a factor for raising the estimation error.

As can be seen from FIG. 9, when the tempo is equal to or lower than 110 bpm, the score position is estimated with higher precision in the tunes not including a drum sound than in the tunes including a drum sound. This is because the inharmonic nature of the drum sound is an important factor for decreasing the chroma vector weight coefficient $w_i^{ch}$ and the frequency characteristic weight calculator $w_i^{sp}$ input from the frequency characteristic weight calculator 10612.

Unlike the above-mentioned rate of low prediction estimation error, even when the rate at which the estimation error less than 0.5 second or less than 2 second is generated is defined as the rate of low prediction estimation error, the same result as shown in FIG. 9 can be obtained in this embodiment.

Figure 10:
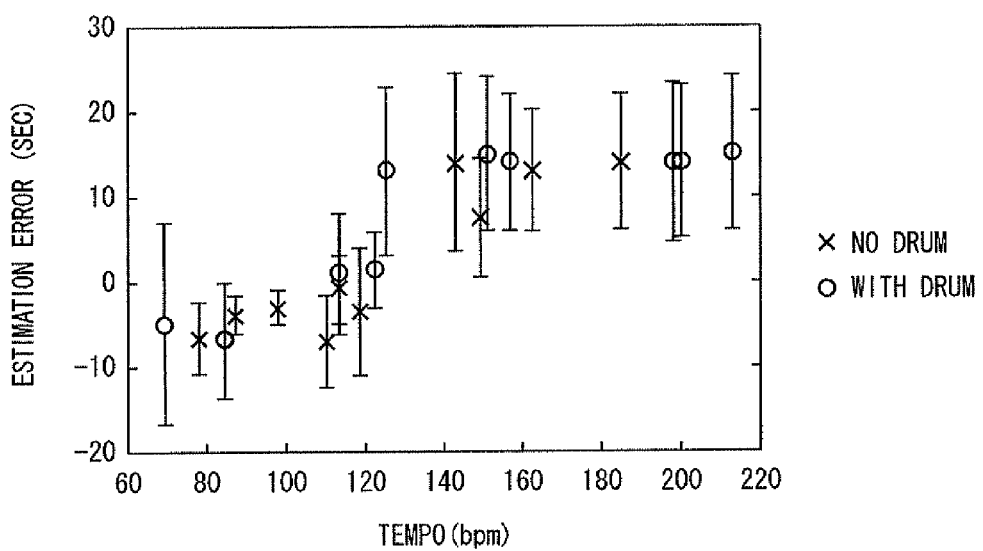
FIG. 10 is a diagram illustrating an example of the estimation error according to the first embodiment.

FIG. 10 is a diagram illustrating an example of the estimation error according to this embodiment. In FIG. 10, the vertical axis represents the estimation error and the horizontal axis represents the tempo (bpm). In FIG. 10, o and x represent the average estimation error at each tempo in a tune in a performance. Here, o indicates a tune including a drum sound and x indicates a tune not including a drum sound. Bar lines extending up and down from o and x represent the standard deviation of each estimation error.

In FIG. 10, the average estimation errors in the tunes with a tempo equal to or lower than 110 bpm are distributed in the range of −10 second to 0 second and the average estimation errors in the tunes with a tempo equal to or higher than 120 bpm are distributed in the range of 10 second to 20 second. In FIG. 10, the standard deviations in the most tunes with a tempo equal to or lower than 110 bpm stay within 7 second, but the standard deviations in the tunes with a tempo equal to or higher than 120 bpm stay before and after 10 second. That is, FIG. 10 shows that the score position can be estimated with higher precision in the tunes with a tempo equal to or lower than 110 bpm than in the tunes with a tempo equal to or higher than 120 bpm.

FIG. 10 shows that the standard deviations in the tunes including a drum sound are greater than in the tunes not including a drum sound, in the tempo range equal to or lower than 110 bpm. Accordingly, it is also proved that the score position can be estimated with higher precision in the tunes not including the drum sound than in the tunes including the drum sound.

Figure 11:
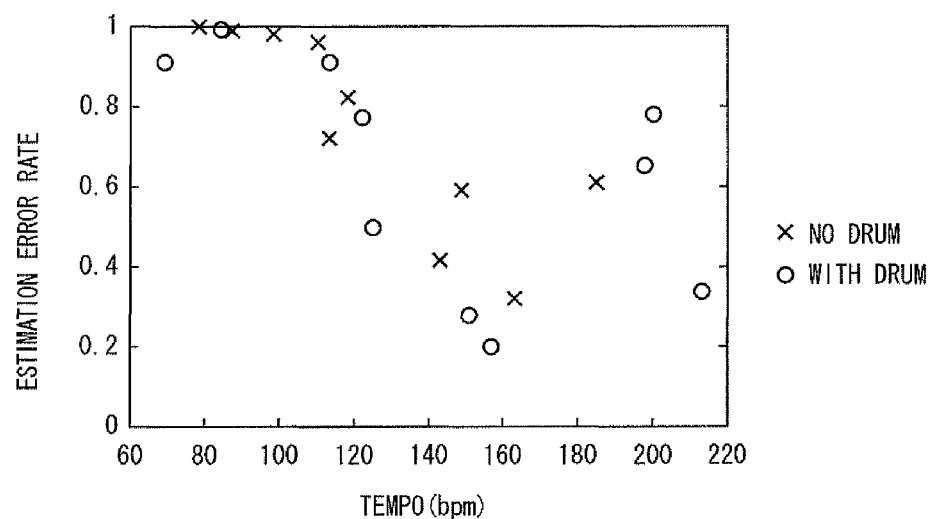
FIG. 11 is a diagram illustrating another example of a rate at which the estimation error is generated according to the first embodiment.

FIG. 11 is a diagram illustrating another example of the rate at which the estimation error is generated according to this embodiment.

This example shows a rate of low prediction estimation error calculated by considering only the case where the score position output unit 108 outputs the estimated score position (melody level).

In FIG. 11, the vertical axis represents the rate of low prediction estimation error and the horizontal axis represents the tempo (bpm). In FIG. 11, o and x represent the rate of low prediction estimation error at each tempo in a performed tune. Here, o indicates a tune including a drum sound and x indicates a tune not including the drum sound.

FIG. 11 shows that the rates of low prediction estimation error in the most tunes with a tempo equal to or lower than 110 bpm are higher than 0.9 and the score position is estimated with high precision. On the other hand, FIG. 11 shows that the rates of low prediction estimation error in the tunes with a tempo equal to or higher than 120 bpm are distributed in the range of 0.2 to 0.8 and thus the score position is not estimated well. However, the rates of low prediction estimation error shown in FIG. 11 are higher than the rates of low prediction estimation error shown in FIG. 9. This result shows that the configuration controlling the output of the estimated score position from the score position output unit 108 based on the confidence calculated by the confidence calculating unit 107 improves the precision for estimating the score position.

Figure 12:
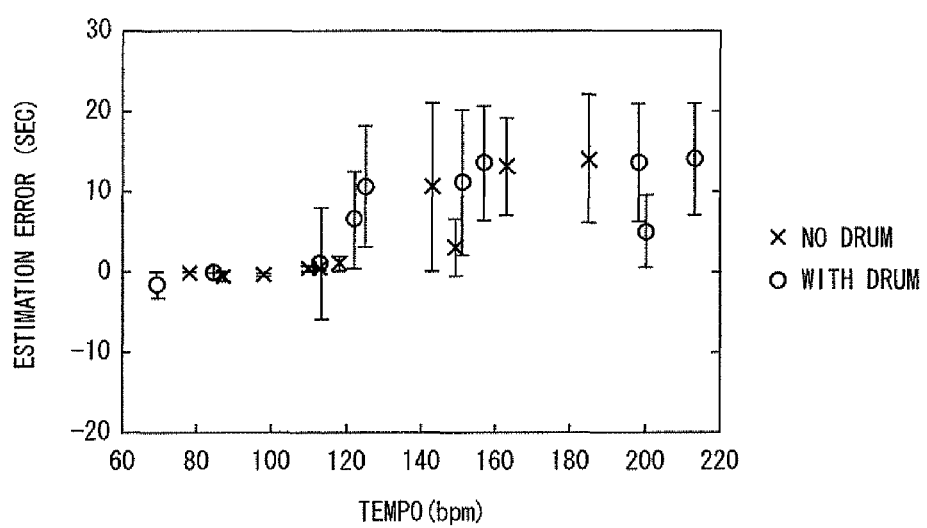
FIG. 12 is a diagram illustrating another example of the estimation error according to the first embodiment.

FIG. 12 is a diagram illustrating another example of the estimation error according to this embodiment.

This example shows the rates of low prediction estimation error calculated by considering only the case where the score position output unit 108 outputs the estimated score position (melody level).

In FIG. 12, the vertical axis represents the estimation error and the horizontal axis represents the tempo (bpm). In FIG. 12, o and x represent the average estimation error at each tempo in a tune in a performance. Here, o indicates a tune including a drum sound and x indicates a tune not including a drum sound. Bar lines extending up and down from o and x represent the standard deviation of each estimation error.

In FIG. 12, the average estimation errors in the tunes with a tempo equal to or lower than 110 bpm are distributed in the range of −2 second to 2 second and the average estimation errors in the most tunes with a tempo equal to or higher than 120 bpm are distributed in the range of 10 second to 15 second. In FIG. 12, the standard deviations in the most tunes with a tempo equal to or lower than 110 bpm stay within 1 second, but the standard deviations in the tunes with a tempo equal to or higher than 120 bpm are in the range of 7 to 10 seconds. Compared with the results shown in FIG. 10, the average estimation errors and the standard deviations shown in FIG. 12 are all lowered.

This result also shows that the configuration controlling the output of the estimated score position from the score position output unit 108 based on the confidence calculated by the confidence calculating unit 107 improves the precision for estimating the score position.

Figure 13:
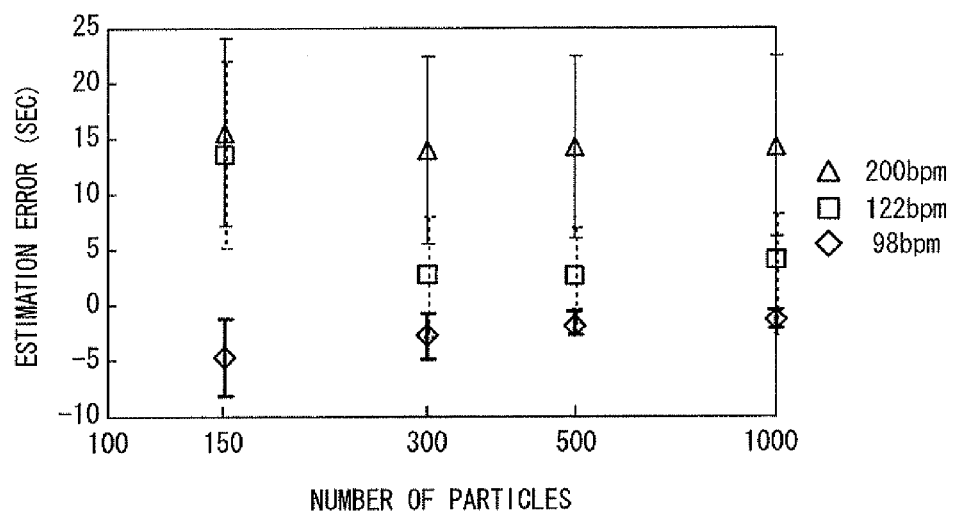
FIG. 13 is a diagram illustrating an example of the relation between the estimation error and the number of particles according to the first embodiment.

FIG. 13 is a diagram illustrating an example of the relation between the estimation error and the number of particles according to this embodiment.

FIG. 13, the vertical axis represents the estimation error and the horizontal axis represents the number of particles. ◇, □, and Δ represent the average estimation error in tunes with tempos of 98 bpm, 122 bpm, and 200 bpm for each number of particles. Bar lines extending up and down from ◇, □, and Δ represent the standard deviation for each number of particles.

As can be seen from FIG. 13, the average estimation error in the tune with a tempo of 98 bpm is −5 second at the number of particles of 150 but converges on the range of −2 to −3 at the number of particles equal to or greater than 300. The standard deviation has a width of ±4 at the number of particles of 150, but converges on ±1 to ±2 seconds at the number of particles equal to or greater than 300.

The average estimation error in the tune with a tempo of 122 bpm is 14 second at the number of particles of 150 but converges on the range of 3 to 5 second at the number of particles equal to or greater than 300. The standard deviation has a width of ±8 at the number of particles of 150, but converges on ±3 at the number of particles equal to or greater than 300.

On the contrary, the average estimation error in the tune with a tempo of 200 bpm is more or less than 15 second, regardless of the number of particles. The standard deviation is ±8 second regardless of the number of particles.

That is, the result shown in FIG. 13 shows that the score position can be estimated with high precision in tunes with a tempo equal to or lower than about 120 bpm when the number of particles is 300. On the contrary, the score position cannot be estimated with high precision in tunes with a higher tempo.

Figure 14:
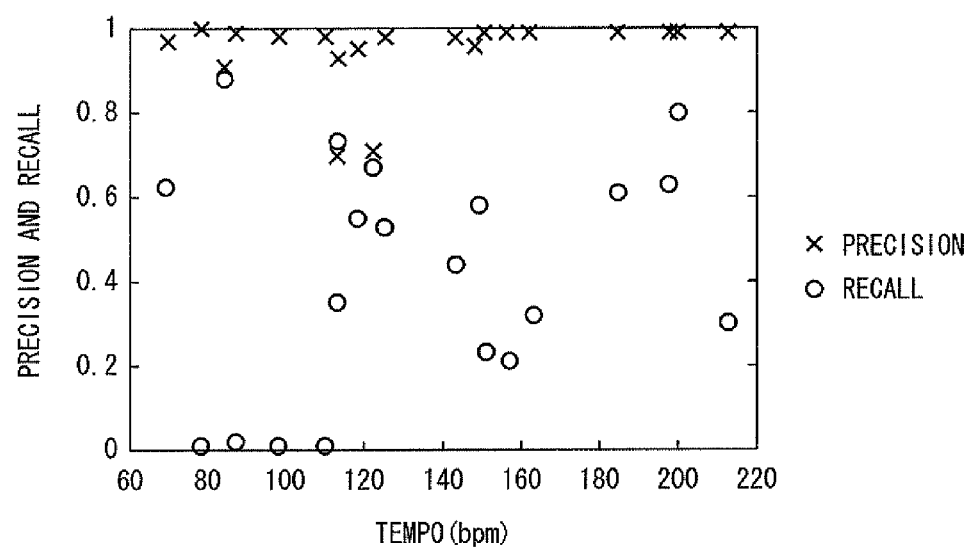
FIG. 14 is a diagram illustrating precision and recall according to the first embodiment.

FIG. 14 is a diagram illustrating an example of the precision and the recall according to this embodiment.

In FIG. 14, the vertical axis represents the precision and the recall and the horizontal axis represents the tempo (bpm).

Here, the precision $\xi_p$ is expressed by $x^r/y$ and the recall $\xi_r$ is expressed by $x^r/z$. Here, $x^r$ is the number of outputs in the rhythm level (where the estimated score position is output from the score position output unit 108) when the absolute value of the estimation error $e(t)$ is not greater than 1 second. y is the total number of outputs in the rhythm level. z is the number of outputs when the absolute value of the estimation error $e(t)$ is greater than 1.

In FIG. 14, x indicates the precision at each tempo of a performed tune and o indicates the recall of each performed tune. In FIG. 14, the precision in the most tunes (particularly, all the tunes with a tempo equal to or higher than 120 bpm) is substantially 1. This means that the estimation error is great when the output of the estimated score position is stopped based on the confidence from the confidence calculating unit 107. In FIG. 14, the average recall is 0.43. Here, when two tunes are excluded from the tunes with a tempo equal to or lower than 110 bpm, the average recall is less than 0.05 and the average recall of the tunes with a tempo equal to or higher than 120 bpm is distributed in the range of 0.2 to 0.8. Since the absolute value of the estimation error e(t) in the tunes with a tempo equal to or lower than 110 bpm is originally hardly greater than 1 second, the estimation precision is not lowered as a whole.

As can also be seen from this above-mentioned result, in this embodiment, the score position in a performance can be estimated with high precision even in the tunes (for example, tunes not including a drum sound) having unclear metrical structures, which it was difficult in the past to estimate. It is proved from the above-mentioned result that the estimation error is likely to increase in tunes with a high tempo. In this case, it is taught that the score position in a tune with a high tempo can be estimated with high precision by shortening the look-ahead time $\Delta T$.

In this manner, in this embodiment, the weight coefficient is calculated based on the feature quantity of an input sound signal and the feature quantity of score information and the score position is estimated using the virtual score position and the virtual tempo corresponding to the weight coefficient. Accordingly, according to this embodiment, it is possible to estimate a score position in a piece of music in a performance with high precision.

Second Embodiment

A second embodiment of the invention will be described below with reference to the accompanying drawings.

Figure 15:
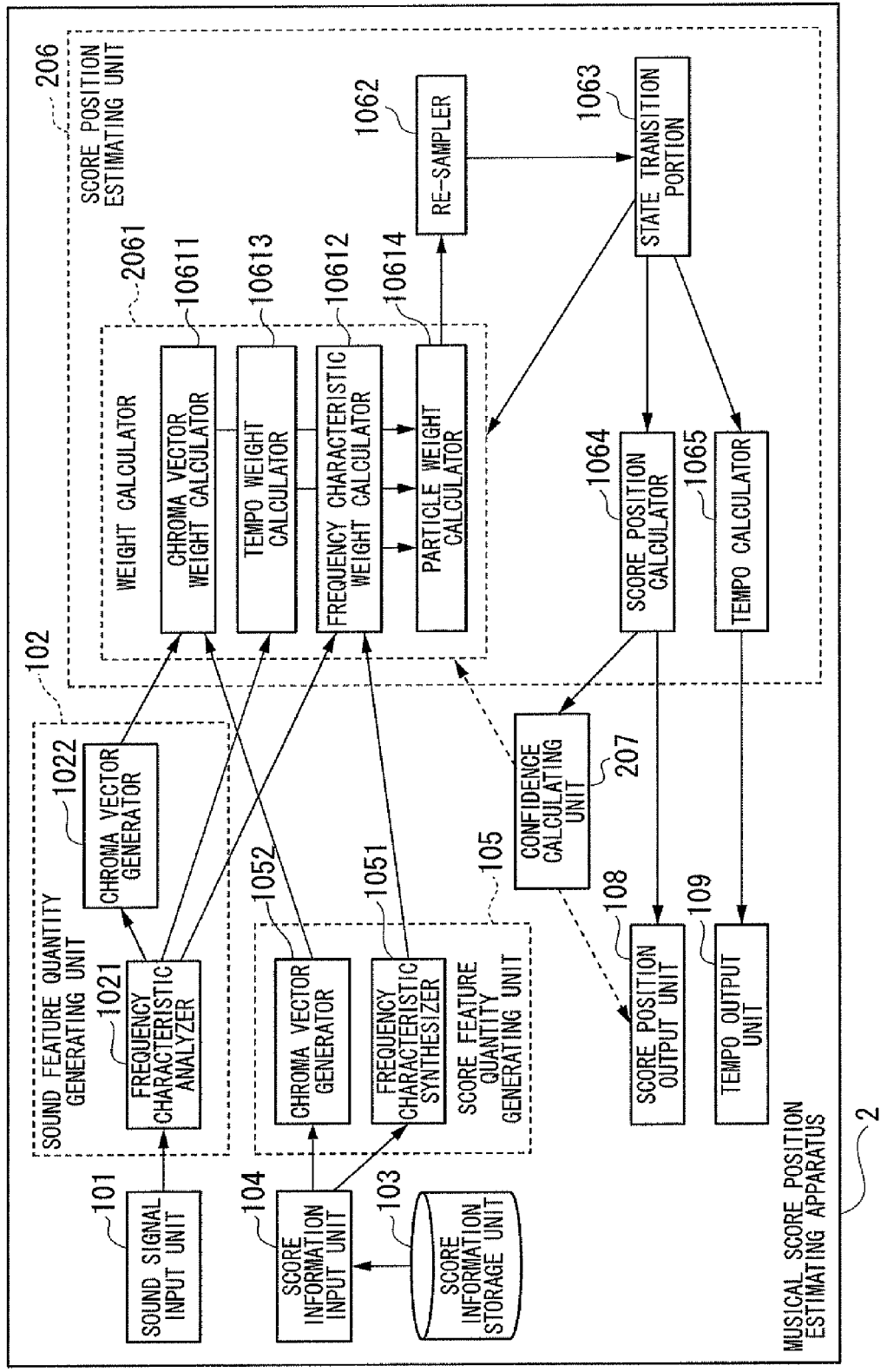
FIG. 15 is a schematic diagram illustrating the configuration of a musical score position estimating apparatus according to a second embodiment of the invention.

FIG. 15 is a schematic diagram illustrating the configuration of a musical score position estimating apparatus 2 according to the second embodiment of the invention.

The musical score estimating apparatus 2 includes a score position estimating unit 206 and a confidence calculating unit 207 instead of the score position estimating unit 106 and the confidence calculating unit 107 of the musical score position estimating apparatus 1.

The score position estimating unit 206 includes a weight calculator 2061 instead of the weight calculator 1061 of the score position estimating unit 106. The weight calculator 2061 is equal to the weight calculator 1061, in that it includes the chroma vector weight calculator 10611, the frequency characteristic weight calculator 10612, and the tempo weight calculator 10613.

The other functions and configurations of the musical score position estimating apparatus 2 are the same as those of the musical score position estimating apparatus 1 according to the first embodiment. Hereinafter, differences of this embodiment from the first embodiment will be mainly described.

The confidence calculating unit 207 is different from the confidence calculating unit 107, in that the confidence coefficient calculated by any of the above-mentioned systems is output to the score position estimating unit 206. The other functions and configurations of the confidence calculating unit 207 are the same as those of the confidence calculating unit 107.

The confidence calculating unit 207 may calculate the confidence output to the score position estimating unit 206 using a method other than the method of calculating the confidence used to control the output of the score position output stop signal and the score position output start signal. For example, the confidence calculating unit 207 may calculate a distance using a DTW (Dynamic Time Warping) method and may output the calculated distance as the confidence coefficient to the score position estimating unit 206. As described later, the confidence calculating unit 207 can determine an interval of the score feature quantity matched with the interval of the sound feature quantity in the course of calculating the distance based on the sound feature quantity and the score feature quantity using the DTW method.

In this embodiment, the configuration calculating the distance may be provided to the weight calculator 2061 to calculate the distance.

The weight calculator 2061 determines whether the observation time should be shifted based on the confidence coefficient input from the confidence calculating unit 207. The process of shifting the observation time will be described below.

Figure 16:
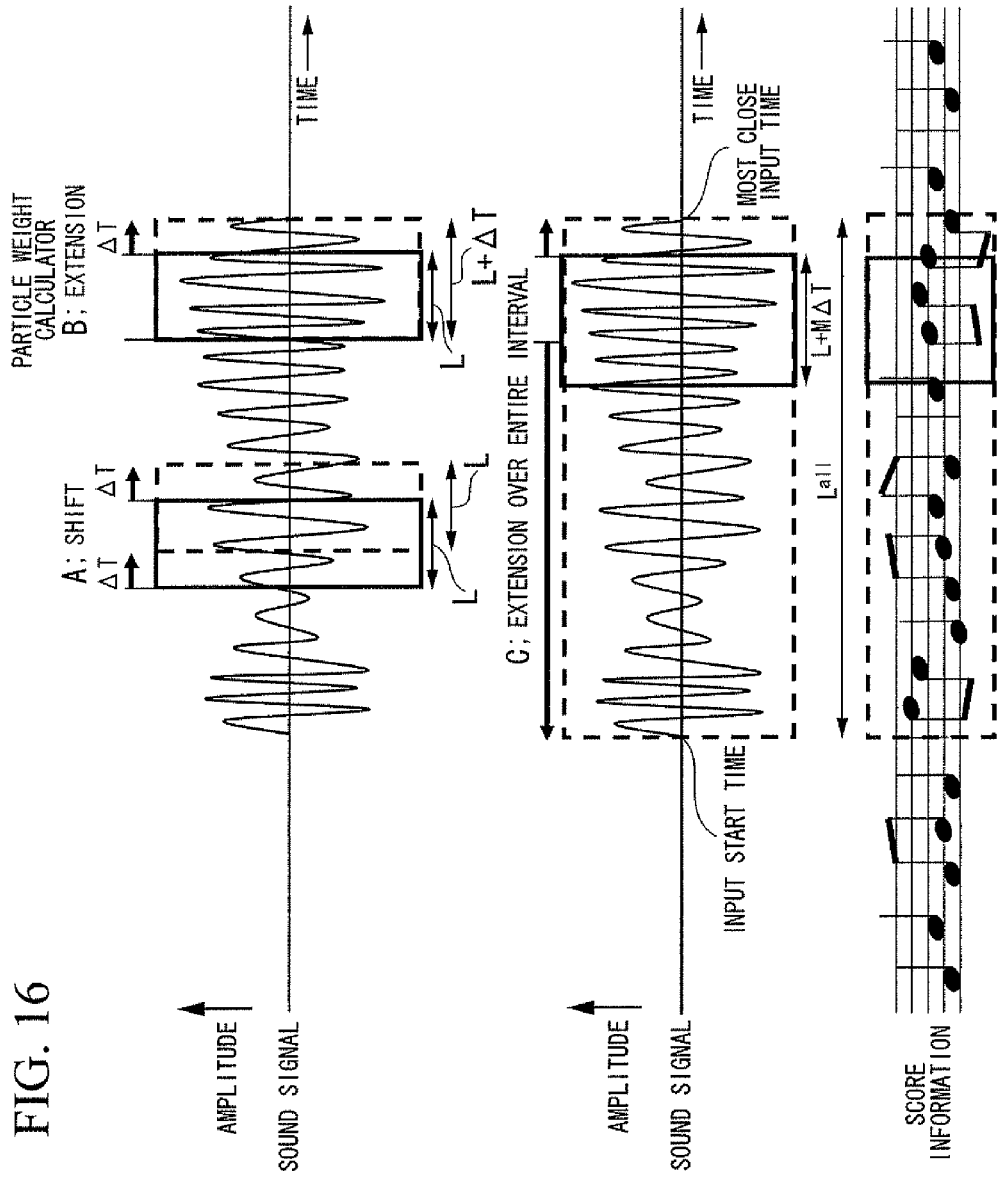
FIG. 16 is a conceptual diagram schematically illustrating the outline of a process of shifting an observation time according to the second embodiment.

FIG. 16 is a conceptional diagram illustrating the outline of the process of shifting the observation time according to this embodiment.

In the upper stage of FIG. 16, the vertical axis represents the amplitude, the horizontal axis represents the time, and the curve represents an example of the waveform of an input sound signal. The left side of the upper stage of FIG. 16 shows the process of shifting the observation time (A. Shift), as in the weight calculator 1061 of the musical score position estimating apparatus 1. The solid rectangle indicates the observation time at the present time and the broken-line rectangle indicates the observation time at the next time. That is, the left side of the upper stage of FIG. 16 shows that the observation time point is shifted to the time point after the look-ahead time $\Delta T$ elapses without changing the observation time L.

The right side in the upper stage of FIG. 16 shows the process (B. Extension) of extending the observation time. The solid rectangle indicates the observation time at the present time and the broken-line rectangle indicates the observation time at the next time. That is, the right side in the upper stage of FIG. 16 shows that the observation time is extended from L to L+$\Delta T$ by fixing the observation start time and shifting the observation end time to the time after the look-ahead time $\Delta T$ elapses.

The middle stage and the lower stage of FIG. 16 show the process (C. Extension over Entire Interval) of extending the observation time over the entire sound signal the sound signal input up to the present time. The horizontal axis in the middle stage and the lower stage of FIG. 16 represents the time. In the middle stage of FIG. 16, the vertical axis represents the amplitude and the curve is an example of the waveform of the input sound signal. The lower stage of FIG. 16 shows the score information displayed on a staff using scales and notes representing the length thereof.

The solid rectangle on the right side in the middle stage of FIG. 16 indicates the observation time at the present time and the solid rectangle on the right side in the lower stage of FIG. 16 indicates the score information in the interval corresponding to the solid rectangle in the middle stage of the drawing. The broken-line rectangle in the middle stage of FIG. 16 indicates the observation time at the next time and the broken-line rectangle in the lower stage of FIG. 16 indicates the score information in the interval corresponding to the broken-line rectangle in the middle stage of the drawing. That is, the middle stage and the lower stage of FIG. 16 show that the observation time L+$\Delta T$ is extended over the entire sound signal $L^{all}$ input up to the present time.

The process of shifting the observation time by the use of the weight calculator 2061 according to this embodiment will be described below.

Figure 17:
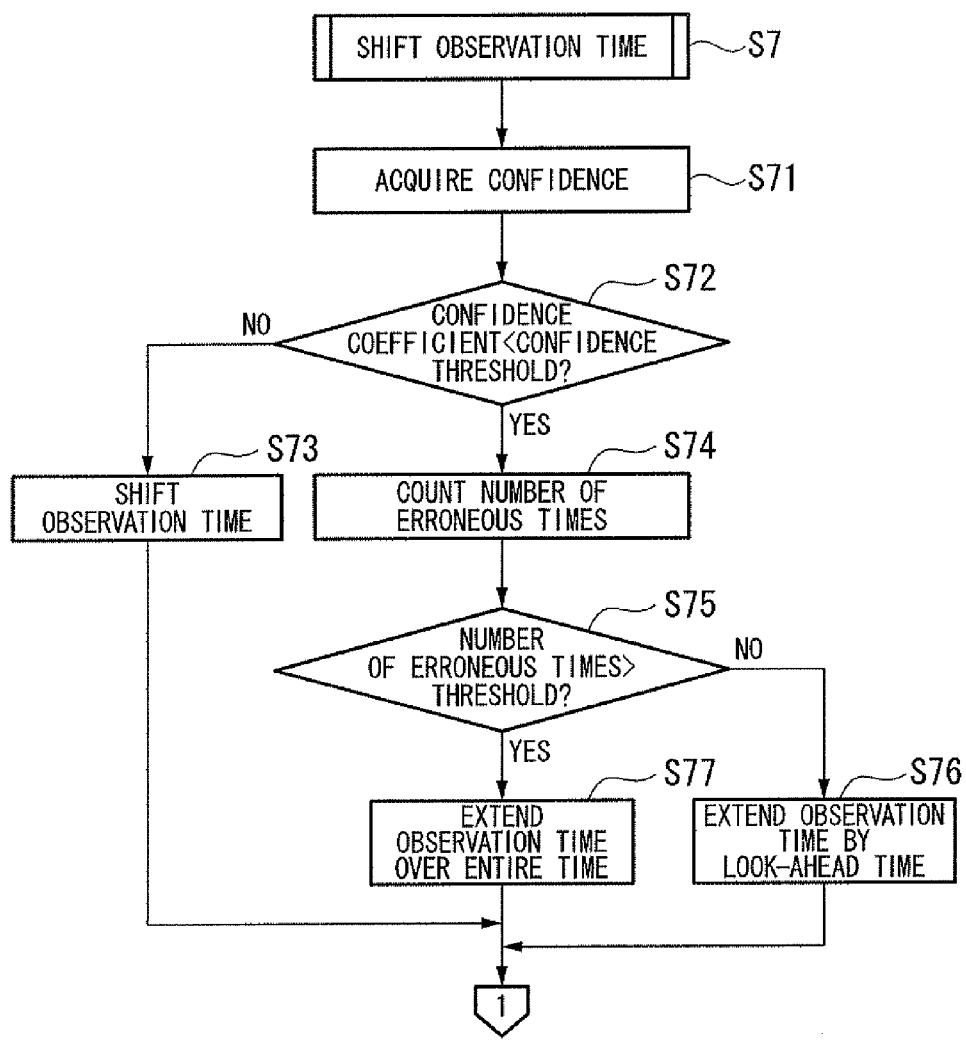
FIG. 17 is a flowchart illustrating the process of shifting an observation time according to the second embodiment.

FIG. 17 is a flowchart illustrating the process of shifting the observation time according to this embodiment.

The weight calculator 2061 performs the following process instead of Step S7 shown in FIG. 6.

(Step S71) The weight calculator 2061 receives the confidence coefficient from the confidence calculating unit 207. Thereafter, the process flow goes to Step S72.

(Step S72) The weight calculator 2061 determines whether the received confidence coefficient is greater than a predetermined threshold value (that is, the confidence of the score time is lower). When the weight calculator 2061 determines that the confidence coefficient is smaller than the predetermined threshold value (NO in Step S72), the process flow goes to Step S73. When the weight calculator 2061 determines that the confidence coefficient is equal to or greater than the predetermined threshold value (YES in Step S72), the process flow goes to Step S74.

(Step S73) The weight calculator 2061 shifts the observation time by the look-ahead time ΔT without changing the observation time L (A. Shift). Thereafter, the process flow goes to Step S2 of FIG. 4.

(Step S74) The weight calculator 2061 adds 1 to the number of erroneous times to count. The number of erroneous times is the number of times the score position and the initial value thereof is erroneously estimated to be zero. Thereafter, the process flow goes to Step S75.

(Step S75) The weight calculator 2061 determines whether the number of erroneous times is greater than a predetermined threshold value (for example, 5). When the weight calculator 2061 determines that the number of erroneous times is greater than the predetermined threshold value (YES in Step S75), the process flow goes to Step S77. When the weight calculator 2061 determines that the number of erroneous times is equal to or smaller than the predetermined threshold value (NO in Step S75), the process flow goes to Step S76.

(Step S76) The weight calculator 2061 extends the observation time by the look-ahead time ΔT without changing the start time of the observation time (B. Extension). The weight calculator 2061 determines whether the number of erroneous times is greater than a predetermined threshold value (for example, 5). Thereafter, the process flow goes to Step S2 of FIG. 4.

(Step S77) The weight calculator 2061 extends the observation time over the entire sound signal input up to the present time (C. Extension over Entire Interval). Thereafter, the process flow goes to Step S2 of FIG. 4.

Accordingly, according to this embodiment, when the estimation error of the score position is great, the observation time of the sound signal (or the sound feature quantity) and the score information (or the score feature quantity) is extended, thereby enhancing the possibility of searching for the part where both feature quantities are matched with each other. Accordingly, the musical score position estimating apparatus 2 according to this embodiment can be recovered from the state where the precision of the estimated score position is low to the state where the precision is more improved. In addition, according to this embodiment, it is possible to restart the output of the estimated score position while avoiding the decrease in confidence, even in the state where the confidence of the estimated score position is low and thus the estimated score position is not output.

The process of calculating the confidence coefficient using the DTW method will be described below.

In the DTW method, the weight calculator 2061 or the confidence calculating unit 207 (hereinafter, referred to as the weight calculator 2061 and the like) match a partial interval of the sound feature quantity and a partial interval of the score feature quantity from which the distance is calculated and determines a set of the interval of the sound feature quantity and the interval of the score feature quantity minimizing the total distance (cumulative distance). That is, the weight calculator 2061 and the like determine the minimized cumulative distance as the confidence coefficient. In the following example, the start point of the interval of the sound feature quantity is referred to as a sound start point and the end point is referred to as a sound end point. The start point of the score feature quantity is referred to as a score start point and the end point thereof is referred to as a score end point.

Figure 18:
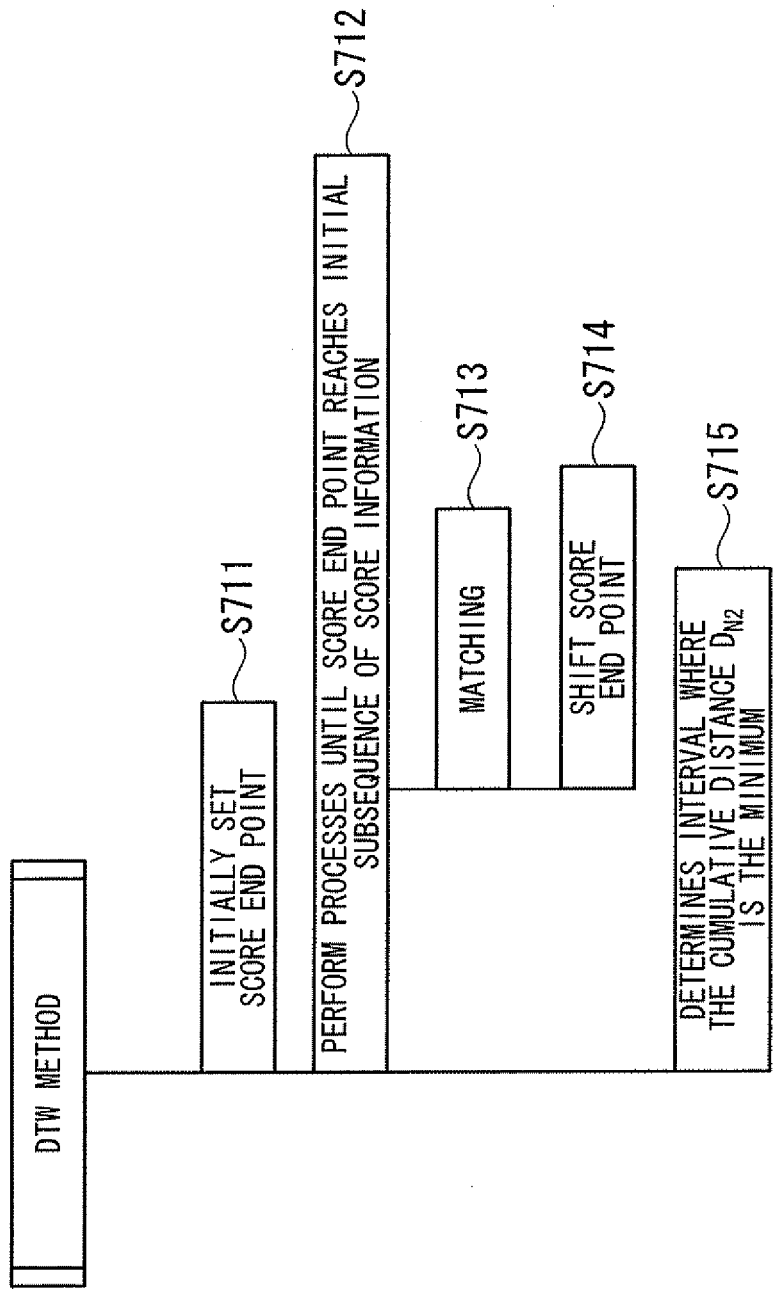
FIG. 18 is a flowchart illustrating a DTW method performed by the musical score position estimating apparatus according to the second embodiment.

FIG. 18 is a flowchart illustrating the DTW method performed by the musical score position estimating apparatus 2 according to this embodiment.

(Step S711) The weight calculator 2061 and the like initially set the score end point n2, for example, to a subsequence including the initial frame of the time-series data of the score feature quantity.

Here, the score end point n2 is the end point of an interval for calculating the cumulative distance $D_{n2}$ in the time-series data of the score feature quantity, that is, is a subsequence including the score feature quantity in the interval. The subsequence is a sub-interval as a unit used in searching the interval in which the time-series data of the score feature quantity and the time-series data of the sound feature quantity are matched each other by comparing both of them.

In this embodiment, the length (for example, corresponding to two score frames, that is, 1/24 second) of the subsequence is determined in advance so that the observation time includes plural subsequences and one subsequence includes an integer number of score frames. Thereafter, the process flow goes to Step S712.

(Step S712) The weight calculator 2061 and the like perform Step S713 and Step S714 until the score end point n2 reaches the initial subsequence of the time-series data of the score feature quantity. Thereafter, the process flow goes to Step S715.

(Step S713) The weight calculator 2061 and the like match the score feature quantity and the sound feature quantity with each other. The weight calculator 2061 and the like calculate the cumulative distance $D_{n2}$ between both feature quantities by performing, for example, a matching process to be described later and determines a target score subsequence n1 indicating the score start point and a target sound subsequence m1 indicating the sound start point. The details of the matching process on the score feature quantity and the sound feature quantity will be described later. Thereafter, the process flow goes to Step S714.

(Step S714) The weight calculator 2061 and the like shift the score end point n2 to the previous subsequence n2-1. Thereafter, the process flow goes to Step S712.

(Step S715) The weight calculator 2061 and the like determines the score feature quantity from the score start point n1 of the score end point n2 in which the cumulative distance $D_{n2}$ is the minimum as the interval of the score feature quantity matched with the sound feature quantity. The weight calculator 2061 and the like determines the sound feature quantity from the sound start point m1 to the sound end point m2 in which the cumulative distance $D_{n2}$ is the minimum as the interval of the sound feature quantity matched with the score feature quantity. Thereafter, the process flow goes to Step S2 of FIG. 4.

Accordingly, the weight calculator 2061 calculates the weight coefficient $w_i$ using the time-series interval of the sound feature quantity matched with the score feature quantity as the observation time.

The process of matching the score feature quantity and the sound feature quantity will be described below.

Figure 19:
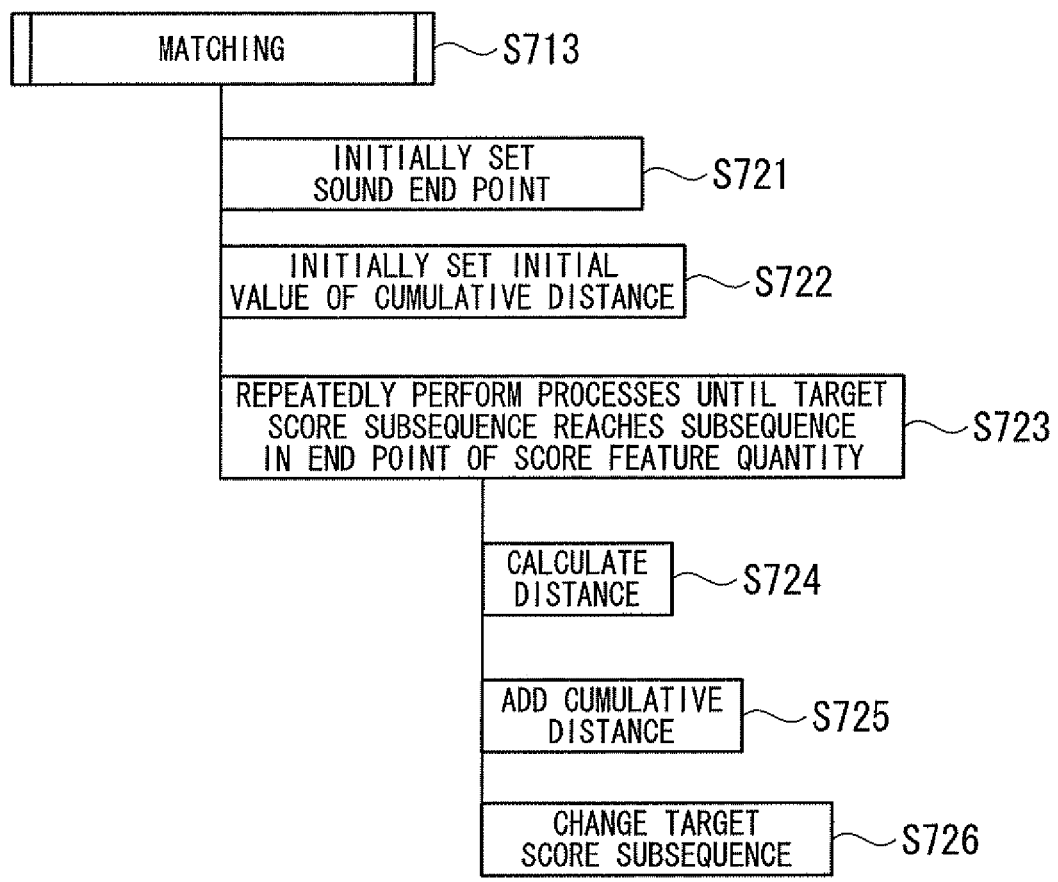
FIG. 19 is a flowchart illustrating a process of matching a musical score feature quantity and a sound feature quantity with each other according to the second embodiment.

FIG. 19 is a flowchart illustrating the process of matching the score feature quantity and the sound feature quantity according to this embodiment.

(Step S721) The weight calculator 2061 and the like initially set the sound end point m2, for example, to a subsequence including the final frame in the time-series data of the sound feature quantity. The weight calculator 2061 and the like initially set the target score subsequence n1 as the score end point n2 and initially set the target sound subsequence m1 as the sound end point m2. Here, the target score subsequence n1 indicates a subsequence to be processed in the time-series data of the score feature quantity. The target sound subsequence m1 indicates a subsequence to be processed in the time-series data of the sound feature quantity. Thereafter, the process flow goes to Step S722.

In this manner, the reason for performing the matching process from the final subsequence is that the musical score position estimating apparatus 2 can estimate the score position based on the newest sound signal.

(Step S722) The weight calculator 2061 and the like initially set the initial value of the cumulative distance $D_{n2}$ as the distance $d_{n1,m1}$ between the score feature quantity in the target score subsequence n1 and the sound feature quantity in the target sound subsequence m1. The distance $d_{n1,m1}$ is a criterion for expressing the similarity or correlation between the score feature quantity and the sound feature quantity. The distance $d_{n1,m1}$ may be a function having a smaller value as the similarity or correlation between both feature quantities. For example, the distance $d_{n1,m1}$ may be the entropy $-w^{ch} \log w^{ch}$ based on the chroma vector weight coefficient $w^{ch}$, or the entropy $-w^{sp} \log w^{sp}$ based on the frequency characteristic weight coefficient $w_i^{sp}$, or the sum thereof. Here, the weight calculator 2061 and the like may use Expressions 4 and 5 using the time corresponding to the target score subsequence n1 or the target sound subsequence m1 as the observation time, for example, at the time of calculating the chroma vector weight coefficient $w^{ch}$. The weight calculator 2061 and the like may use Expressions 5 to 8 using the time corresponding to the target score subsequence n1 or the target sound subsequence m1 as the observation time, for example, at the time of calculating the frequency characteristic weight coefficient $w_i^{sp}$. Thereafter, the process flow goes to Step S723.

(Step S723) The weight calculator 2061 and the like repeatedly perform Step S724 to Step S726 until the target score subsequence n1 reaches the initial subsequence in the time-series data of the score feature quantity or the target sound subsequence m1 reaches the initial subsequence in the time-series data of the sound feature quantity.

(Step S724) The weight calculator 2061 and the like calculate the distance three types of subsequence sets (1) to (3). The reason for allowing the weight calculator 2061 and the like to calculate three types of distances is to consider that a tempo fluctuation in a piece of music in a performance relatively delays the score feature quantity and relatively delays the sound feature quantity.

(1) The distance $d_{n1-1,m1}$ between the score feature quantity in the previous target score subsequence n1-1 and the sound feature quantity in the present target sound subsequence m1.

(2) The distance between the score feature quantity in the previous target score subsequence n1-1 and the sound feature quantity in the previous target sound subsequence m1-1.

(3) The distance $d_{n1,m1-1}$ between the score feature quantity in the present target score subsequence n1 and the sound feature quantity in the previous target sound subsequence m1-1.

In this step, the method of calculating the distance may be the same as described in Step S722.

The weight calculator 2061 and the like select the minimum distance of the distances $d_{n1-1,m1}$, and $d_{n1-1,m1-1}$, and $d_{n1-1,m1-1}$. Thereafter, the process flow goes to Step S725.

(Step S725) The weight calculator 2061 and the like adds the selected distance to the cumulative distance $D_{n2}$. Thereafter, the process flow goes to Step S726.

(Step S726) The weight calculator 2061 and the like change the target score subsequence n1 and the target sound subsequence m1 to a set of subsequences corresponding to the selected distance. That is; when the distance $d_{n1-1,m1}$ is selected, the weight calculator 2061 and the like change the target score subsequence n1 to the previous target score subsequence n1-1 and do not change the target sound subsequence m1.

When the distance $d_{n1-1,m1-1}$ is selected, the weight calculator 2061 and the like change the target score subsequence n1 to the previous target score subsequence n1-1 and change the target sound subsequence m1 to the previous target sound subsequence m1-1.

When the distance $d_{n1,m1-1}$ is selected, the weight calculator 2061 and the like do not change the target score subsequence n1 and change the target sound subsequence m1 to the previous target sound subsequence m1-1.

Thereafter, the process flow goes to Steps S723.

Accordingly, the weight calculator 2061 and the like specify the interval in which the sound feature quantity and the score feature quantity are matched with each other and the weight calculator 2061 and the like calculate the weight coefficient $w_i$ based on the specified interval. Accordingly, the musical score position estimating apparatus 2 according to this embodiment can be easily recovered from the erroneous estimation of the score position and can restart the output of the estimated score position.

In the process of shifting the observation time, it has been described that the interval in which the score feature quantity and the sound feature quantity are matched with each other is specified using the DTW method after the observation time is extended over the entire interval (C.), but this embodiment is not limited to this configuration. In this embodiment, the interval in which both are matched may be specified by applying the DTW method to the time-series data of the score feature quantity and the sound feature quantity in the observation time extended by the look-ahead time ΔT (B.) after the shift (A.). Accordingly, it is possible to recover the state where the estimation error of the score position can be sequentially calculated with high precision.

In this embodiment, the extension time for extending the observation time (B.) is not limited to the look-ahead time ΔT, but may be any time or may be advanced without fixing the start point.

In this embodiment, candidates of the intervals of the sound feature quantity matched with the score feature quantity may be determined by performing the DTW method based on a larger subsequence (including a smaller number of intervals subjected to the matching process) and the DTW method may be performed on the determined candidates of the interval based on a smaller subsequence (including a larger number of intervals subjected to the matching process).

In the DTW method, the interval of the sound feature quantity matched with the score feature quantity is determined, but the interval of the score feature quantity matched with the sound feature quantity may be determined in this embodiment.

In this embodiment, if the input digital sound signal can be transformed into a frequency-domain signal, the frequency characteristic analyzer 1021 may use a method other than the FFT, for example, the DFT (Discrete Fourier Transform).

In this embodiment, the re-sampler 1062 may reject a predetermined number of particles $N_r$ (for example 50 particles) from the particle having the smallest normalized particle weight coefficient $p_i$.

A part of the musical score position estimating apparatuses 1 and 2 according to the above-mentioned embodiments, such as the sound feature quantity generating unit 102, the score feature quantity generating unit 105, the score position estimating units 106 and 206, and the confidence calculating units 107 and 207 may be embodied by a computer. In this case, the part may be embodied by recording a program for performing the control functions in a computer-readable recording medium and causing a computer system to read and execute the program recorded in the recording medium. Here, the "computer system" is built in the speech recognition apparatuses 1 and 2 and the speech recognition robot 3 and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

In addition, part or all of the musical score position estimating apparatuses 1 and 2 according to the above-mentioned embodiments may be embodied as an integrated circuit such as an LSI (Large Scale Integration). The functional blocks of the musical score position estimating apparatuses 1 and 2 may be individually formed into processors and a part or all thereof may be integrated as a single processor. The integration technique is not limited to the LSI, but they may be embodied as, a dedicated circuit or a general-purpose processor. When an integration technique taking the place of the LSI appears with the development of semiconductor techniques, an integrated circuit based on the integration technique may be employed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A musical score position estimating apparatus comprising:
   a sound feature quantity generating unit configured to generate a feature quantity of an input sound signal;
   a score position estimating unit configured to calculate a weight coefficient based on the feature quantity of the sound signal and a feature quantity of musical score information and estimates a musical score position using a virtual musical score position and a virtual tempo corresponding to the weight coefficient; and
   a state transition unit configured to update the virtual musical score position based on the virtual tempo and a first random number and update the virtual tempo based on a second random number.

2. The musical score position estimating apparatus according to claim 1, wherein the feature quantities include a frequency characteristic or a chroma vector including a plurality of values of intensity for each musical scale, and
   wherein the musical score estimating unit calculates the weight coefficient using a chroma vector weight coefficient indicating the similarity between the chroma vector based on the sound signal and the chroma vector based on the musical score information, a frequency characteristic weight coefficient indicating the similarity between the frequency characteristic of the sound signal and the frequency characteristic of the musical score information, or a tempo weight coefficient based on the autocorrelation of the frequency characteristic of the sound signal.

3. The musical score position estimating apparatus according to claim 1, further comprising a confidence calculating unit configured to calculate the confidence of the estimated musical score position based on the virtual musical score position, and determines whether the estimated musical score position should be output based on the calculated confidence.

4. The musical score position estimating apparatus according to claim 1, further comprising a confidence calculating unit configured to calculate the confidence of the estimated musical score position,
   wherein the score position estimating unit determines whether an interval of the feature quantity from which the weight coefficient is calculated should be extended based on the calculated confidence.

5. A musical score position estimating method in a musical score position estimating apparatus, comprising:
   a first step of causing the musical score position estimating apparatus to generate a feature quantity of an input sound signal every predetermined interval;
   a second step of causing the musical score position estimating apparatus to calculate a weight coefficient based on the feature quantity of the sound signal and a feature quantity of musical score information and to estimate a musical score position using a virtual musical score position and a virtual tempo corresponding to the weight coefficient; and
   a third step of causing the musical score position estimating apparatus to update the virtual musical score position based on the virtual tempo and a first random number and update the virtual tempo based on a second random number.

6. A musical score position estimating program allowing a computer of a musical score position estimating apparatus to perform:
   a process of generating a feature quantity of an input sound signal;
   a process of calculating a weight coefficient based on the feature quantity of the sound signal and a feature quantity of musical score information and estimating a musical score position using a virtual musical score position and a virtual tempo corresponding to the weight coefficient; and a process of updating the virtual musical score position based on the virtual tempo and a first random number and updating the virtual tempo based on a second random number.

* * * * *